US009525758B2

(12) United States Patent
Yasuma

(10) Patent No.: US 9,525,758 B2
(45) Date of Patent: Dec. 20, 2016

(54) INFORMATION PROCESSING SYSTEM, INFORMATION PROCESSING APPARATUS, METHOD FOR SELECTING DEVICE, AND PROGRAM THEREFOR

(71) Applicant: CANON KABUSHIKI KAISHA, Tokyo (JP)

(72) Inventor: Kensuke Yasuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/931,306

(22) Filed: Jun. 28, 2013

(65) Prior Publication Data

US 2014/0012894 A1 Jan. 9, 2014

(30) Foreign Application Priority Data

Jul. 4, 2012 (JP) .................................. 2012-150473

(51) Int. Cl.

| G06F 15/16 | (2006.01) |
|---|---|
| H04L 29/06 | (2006.01) |
| H04L 29/08 | (2006.01) |
| G06Q 10/10 | (2012.01) |

(52) U.S. Cl.
CPC ............. *H04L 67/42* (2013.01); *G06Q 10/10* (2013.01); *H04L 63/10* (2013.01); *H04L 67/10* (2013.01); *H04L 67/16* (2013.01)

(58) Field of Classification Search
CPC .......... G06F 15/16; H04L 67/42; H04L 63/10; H04L 67/16; H04L 67/10; G06Q 10/10
See application file for complete search history.

(56) References Cited

U.S. PATENT DOCUMENTS

| 8,819,109 | B1* | 8/2014 | Krishnamurthy et al. ... 709/203 |
| 8,897,484 | B1* | 11/2014 | Fredinburg ...... G11B 20/00855 382/100 |
| 2004/0010421 | A1* | 1/2004 | Mina et al. ........................ 705/2 |
| 2005/0120210 | A1* | 6/2005 | Behbehani .................... 713/168 |
| 2006/0179048 | A1* | 8/2006 | Doumuki ......................... 707/4 |
| 2008/0022135 | A1* | 1/2008 | Gaya ............................. 713/193 |
| 2008/0270263 | A1* | 10/2008 | Hill et al. ....................... 705/27 |
| 2009/0235173 | A1* | 9/2009 | Ichihara ........................ 715/733 |

(Continued)

FOREIGN PATENT DOCUMENTS

| JP | 2009-175966 A | 8/2009 |
| JP | 2011-128775 A | 6/2011 |

OTHER PUBLICATIONS

Jonietz (Jonietz, Erika, Augmented Identity—A new app makes it possible to identify people and learn about them just by pointing your phone, MIT Technology Review, Feb. 23, 2010; retrieved on Jun. 11, 2015 from http://www.technologyreview.com/news/417655/augmented-identity/).*

*Primary Examiner* — Tauqir Hussain
*Assistant Examiner* — Michael A Keller
(74) *Attorney, Agent, or Firm* — Canon USA Inc., IP Division

(57) ABSTRACT

An information processing system for instructing a first device associated with a first user and any one of a plurality of devices associated with a second user to execute a predetermined service includes an acquisition unit configured to acquire the association between the first and second user and a selection unit configured to select from the plurality of devices a device for executing a service, based on the association between the first and second user.

14 Claims, 26 Drawing Sheets

(56) References Cited

U.S. PATENT DOCUMENTS

| | | | |
|---|---|---|---|
| 2012/0079559 A1* | 3/2012 | Reznik | H04L 12/5692 |
| | | | 726/1 |
| 2012/0203918 A1* | 8/2012 | Berenberg et al. | 709/229 |
| 2012/0220376 A1* | 8/2012 | Takayama et al. | 463/42 |
| 2013/0124671 A1* | 5/2013 | Hunter et al. | 709/217 |
| 2014/0006496 A1* | 1/2014 | Dearman | H04L 67/16 |
| | | | 709/204 |
| 2014/0032489 A1* | 1/2014 | Hebbar et al. | 707/608 |

* cited by examiner

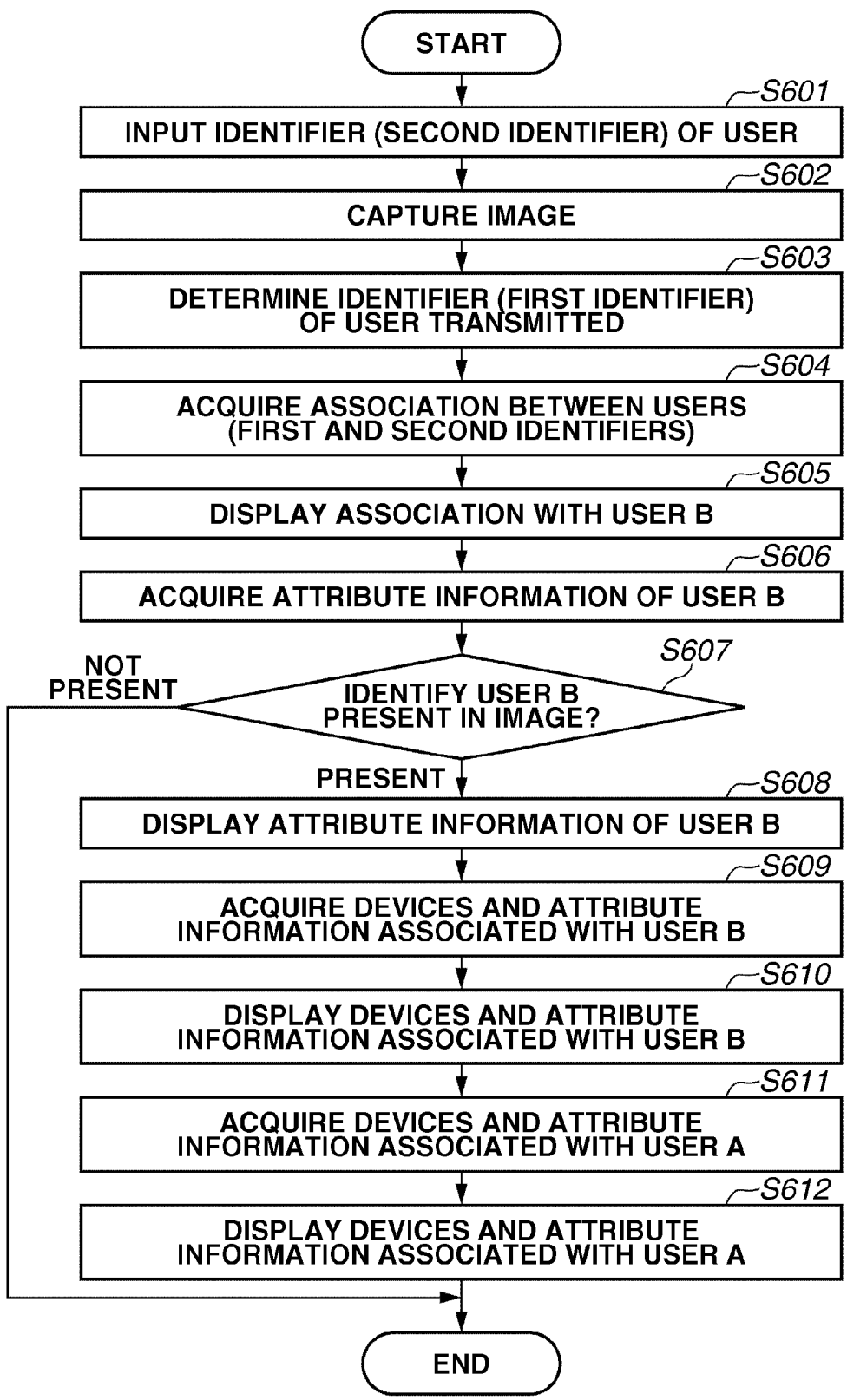

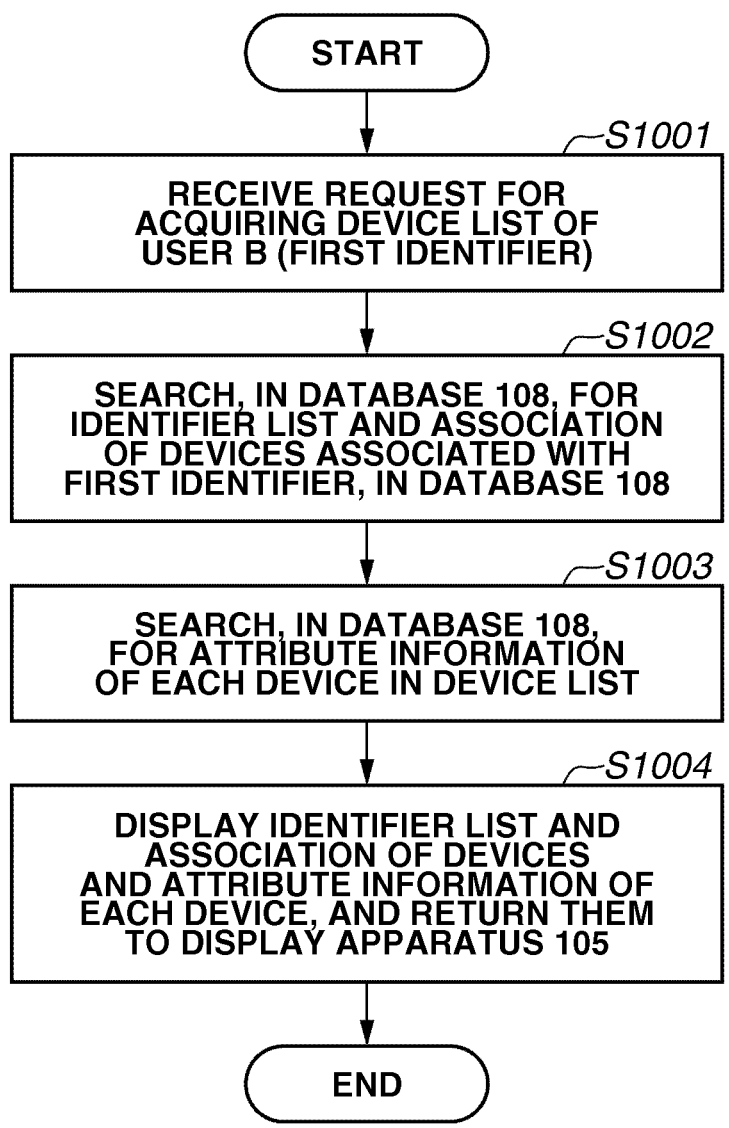

FIG.16A

| IDENTIFIER OF STARTING NODE | 1 |
|---|---|
| IDENTIFIER OF ENDING NODE | 2 |
| TYPE | FRIEND (PRIVATE) |
| INTENSITY | 50 |

FIG.16B

| IDENTIFIER OF STARTING NODE | 101 |
|---|---|
| IDENTIFIER OF ENDING NODE | 102 |
| TYPE | JOB (BUSINESS) |
| INTENSITY | 0 |

FIG.17A

| IDENTIFIER OF STARTING NODE | 1 |
|---|---|
| IDENTIFIER OF ENDING NODE | 3 |
| TYPE | OWNED, PRIVATE |
| INTENSITY | 100 |

FIG.17B

| IDENTIFIER OF STARTING NODE | 2 |
|---|---|
| IDENTIFIER OF ENDING NODE | 4 |
| TYPE | RENTAL, BUSINESS |
| INTENSITY | 0 |

FIG.17C

| IDENTIFIER OF STARTING NODE | 2 |
|---|---|
| IDENTIFIER OF ENDING NODE | 5 |
| TYPE | OWNED, PRIVATE |
| INTENSITY | 100 |

FIG.18A

| NAME | Kenji |
|---|---|
| AGE | 29 |
| GENDER | MALE |
| HOBBY | SOCCER |
| GPS | 35.658609,139.745447 |
| SNS USER NAME | kenji@sns.canon.co.jp |
| SNS PASSWORD | password |

FIG.18B

| NAME | Naoki |
|---|---|
| AGE | 31 |
| GENDER | MALE |
| HOBBY | DARTS |
| GPS | 35.658609,139.745447 |
| SNS USER NAME | naoki@exmaple.canon.co.jp |
| SNS PASSWORD | password |

FIG.19A

| NAME | Kenji's Cam |
|---|---|
| DEVICE TYPE | Camera XYZ (DISPLAY APPARATUS 105) |
| CONNECTION | ONLINE |
| STATUS | AVAILABLE |
| FIRMWARE VERSION | 1.00 |
| AVAILABLE SERVICES | MESSAGE SERVICE, IMAGE EXCHANGE SERVICE, PRINT SERVICE (TRANSMISSION) |
| GPS | 35.658609,139.745447 |
| OWNER | USER A |
| MAIN PLACE OF USE | MOBILE |
| APPLICATION | PRIVATE |

FIG.19B

| NAME | Naoki's Printer |
|---|---|
| DEVICE TYPE | Camera ABC |
| CONNECTION | OFFLINE |
| STATUS | UNAVAILABLE |
| FIRMWARE VERSION | 2.01 |
| AVAILABLE SERVICES | PRINT SERVICE (PRINTING), MESSAGE SERVICE |
| GPS | 35.658609,138.745447 |
| OWNER | USER B |
| MAIN PLACE OF USE | COMPANY |
| APPLICATION | BUSINESS |

FIG.19C

| NAME | Naoki's Phone |
|---|---|
| DEVICE TYPE | PhoneABC |
| CONNECTION | ONLINE |
| STATUS | AVAILABLE |
| FIRMWARE VERSION | 2.01 |
| AVAILABLE SERVICES | MESSAGE SERVICE, IMAGE EXCHANGE SERVICE |
| GPS | 35.658609,139.745447 |
| OWNER | USER B |
| MAIN PLACE OF USE | MOBILE |
| APPLICATION | PRIVATE |

FIG.21A

| DEVICE NAME | SERVICES |
|---|---|
| DEVICE 1503 (Kenji's Cam) | MESSAGE SERVICE, IMAGE EXCHANGE SERVICE, PRINT SERVICE (TRANSMISSION) |

FIG.21B

| DEVICE NAME | SERVICES |
|---|---|
| DEVICE 1504 (Naoki's Printer) | PRINT SERVICE (PRINTING), MESSAGE SERVICE, SCANNING SERVICE |
| DEVICE 1505 (Naoki's Phone) | MESSAGE SERVICE, IMAGE EXCHANGE SERVICE |

INFORMATION PROCESSING SYSTEM, INFORMATION PROCESSING APPARATUS, METHOD FOR SELECTING DEVICE, AND PROGRAM THEREFOR

BACKGROUND

Field of the Disclosure

Aspects of the present invention generally relate to an information processing system for executing a predetermined service between users.

Description of the Related Art

Recent years have seen a popularization of what is called cloud services in which a client accesses a server via the Internet, and executes a desired service on a web browser, without installing a program for service execution on the client side. Further, with the development of social networking services (SNS's), communication between users has attracted attention.

There has been proposed a technique for restricting access to user information in virtual communities formed of the above-described SNS's, for sharing information between a plurality of users. For example, there has been proposed a system in which, when a first user requests a second user to approve the generation of an association with the first user (setting of the right to access user information), the right to access user information of the first user is temporarily given to the second user before the generation of an association between the first and second users (Japanese Patent Application Laid-Open No. 2009-175966). According to Japanese Patent Application Laid-Open 2009-175966, the second user can browse the user information of the first user before approving the generation of an association with the first user, making it easier to determine whether the right to access the user information of the second user should be set to the first user.

SUMMARY

According to an aspect of the present invention, an information processing system for instructing a first device associated with a first user and any one of a plurality of devices associated with a second user to execute a predetermined service includes a first acquisition unit configured to acquire the association between the first and second user, and a selection unit configured to select from the plurality of devices a device for executing a service, based on the association between the first and second user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating processing performed by the display apparatus to inquire of the server for information.

FIG. 10 is a flowchart illustrating processing performed by the server to prepare a device list.

FIGS. 16A and 16B illustrate details of information about the association between users.

FIGS. 17A, 17B, and 17C illustrate details of information about the association between user and device.

FIGS. 18A and 18B illustrate details of user attribute information.

FIGS. 19A, 19B, and 19C illustrate details of device attribute information.

FIGS. 21A and 21B illustrate device attribute information used by the server to generate a service list.

DESCRIPTION OF THE EMBODIMENTS

Various exemplary embodiments, features, and aspects of the invention will be described in detail below with reference to the drawings.

With the increase in the use of various apparatuses in a networked environment and with the increase of functionality of these apparatuses in recent years, a plurality of devices owned by each user has applied to diverse services. For example, message services, such as e-mail, can be performed by using a notebook personal computer (PC) and a mobile phone. Further, image exchange services for exchanging captured images with another user can be utilized by using a network-based digital camera and a mobile phone, such as a smart phone.

Thus, when executing a desired service between devices owned by different users and performing communication between users, a plurality of combinations of devices may be applicable to the desired service. If a device for performing a service is selected based on an instruction of a user, the user is forced to perform complicated operations. This means that existing services require improvement in usability.

A first exemplary embodiment of the present invention is directed to improvement in usability when performing a predetermined service between devices respectively associated with different users.

Figure 1:
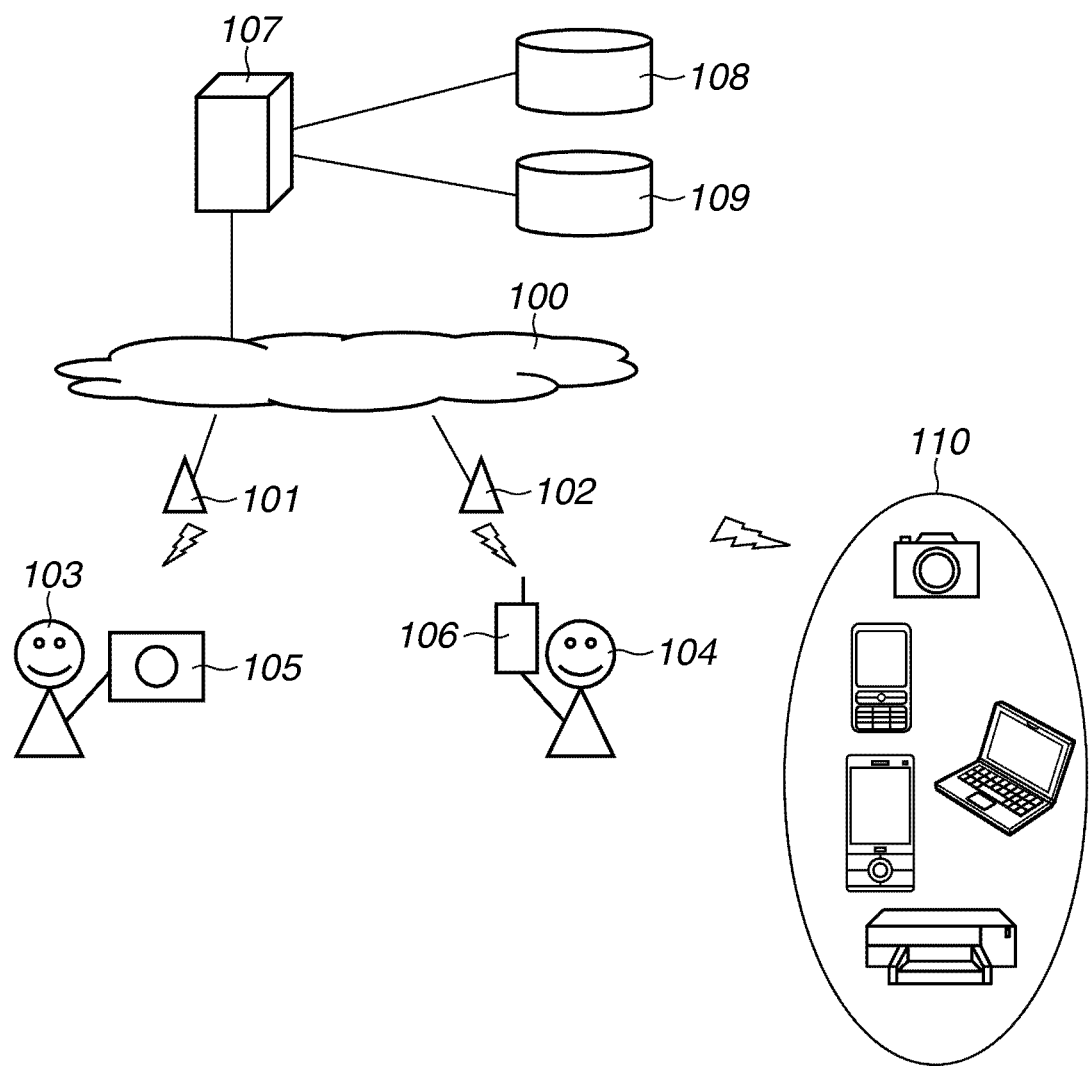
FIG. 1 illustrates a configuration of a system according to the present exemplary embodiment.

The following describes exemplary embodiments of the present invention with reference to the accompanying drawings. In the present exemplary embodiment, an information processing system for executing a predetermined service between devices of different users will be described. In the present information processing system, a service is executed between users having an association constructed by SNS's. FIG. 1 illustrates a configuration of a system according to the present exemplary embodiment.

Referring to FIG. 1, the Internet 100 is a set of diverse networks. The Internet 100 is not limited to the Internet, and may be a wide area network (WAN), a local area network (LAN), or a combination of both. A wireless base station 101 configures a wireless communication network with a display apparatus 105 (described below) by using a communication method based on the wireless LAN (conforming to IEEE802.11 Series, for example). The communication method is not limited thereto, and may be wireless communication, such as Worldwide Interoperability for Microwave Access (WiMAX) and Bluetooth (registered trademark), or cable communication. The wireless base station 101 is connected to the Internet 100 to relay communication between the display apparatus 105 and a server 107 (described below).

A wireless base station 102 configures a wireless communication network with a transmission apparatus 106 (described below) by using a communication method based on the wireless LAN (conforming to IEEE802.11 Series, for example). The wireless base station 101 is connected to the Internet 100 to relay communication between the transmission apparatus 106 and the server 107 (described below). The communication method is not limited thereto, and may be wireless communication, such as WiMAX and Bluetooth (registered trademark), or cable communication. A user 103 is a user A (first user) of the present information processing system. A user A 103 is an owner of the display apparatus 105. A user 104 is a user B (second user) of the present information processing system. A user B 104 is an owner of the transmission apparatus 106.

The display apparatus 105 (first device) is provided with a display for displaying images and various information. The display apparatus 105 is provided with a wireless communication function, and communicates with the server 107 via the wireless base station 101. The display apparatus 105 communicates with the transmission apparatus 106. The transmission apparatus 106 transmits an identifier (user identifier (ID), account ID, etc.) of the owner as a wireless signal on a periodical basis or in response to a request from other apparatus. The transmission apparatus 106 transmits the identifier of the user B 104 to the periphery thereof (a communicable range). Further, the transmission apparatus 106 communicates with the server 107 via the wireless base station 102. A device group 110 includes a plurality of devices owned by the user B 104, such as a mobile phone, a printer, a notebook PC, a tablet PC, and a digital camera. The user B 104 can register in the server 107 information that the user B 104 owns the device group 110, purpose of use (business use or private use) and place of use of each device of the device group 110 as the attribute information. (The association between user and device can be registered in the server 107.) Although the association between user and device is defined based on the device attribute information, the association between user and device may be separately defined based on a direct input from users.

The server 107 executes a predetermined service between devices of different users. The server 107 manages information about the present information processing system: the association between users, the association between each user and devices owned by the user, and the user and device attribute information.

The server 107 pre-stores the association between users, devices owned by each user, and the association between each user and devices owned by the user based on an input from each user. These pieces of stored information may be imported, for example, from a social networking service (SNS) on the Internet. The server 107 provides a social networking service, and utilizes the association between users configured by the relevant service and the information about devices owned by each user.

Upon reception of a request for executing a service between a user and another user, the server 107 determines whether the service is executable from the viewpoint of security based on the association between the relevant user and another user. When the relevant service is executable by a plurality of devices owned by another user, a device for executing the relevant service is selected based on the association between the relevant service and another user.

A database 108 is a relational database (RDB) storing the association between users and the association between user and device. Although, in the present exemplary embodiment, the database 108 is implemented as an RDB, it is not limited thereto, and may be a database of other types, such as an Extensible Markup Language Database (XMLDB). A database 109 is an RDB for storing the user attribute information and device attribute information. Although, in the present exemplary embodiment, the database 109 is implemented as an RDB, it is not limited thereto, and may be a database of other type, such as an XMLDB.

Figure 15:
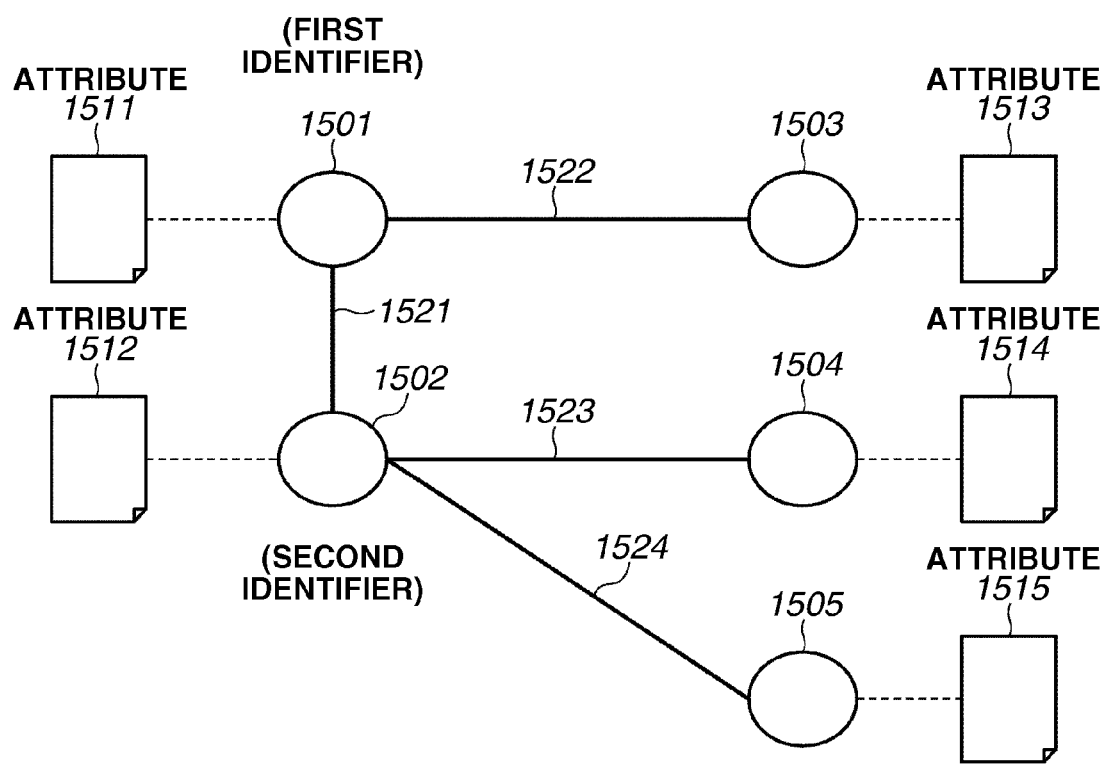
FIG. 15 illustrates an association diagram according to a first exemplary embodiment.

The following describes association information stored in the database 108 and managed by the server 107. FIG. 15 is an association diagram conceptually illustrating the association between users and the association between user and device. The server 107 forms an association diagram as illustrated in FIG. 15 based on the association information, and manages the association between users and the association between user and device. Referring to the association diagram illustrated in FIG. 15, users and devices are recognized as a node, and nodes having an association with each other are connected via an edge. Referring to FIG. 15, a node 1501 indicates the user A 103. A node 1502 indicates the user B 104. A node 1503 indicates a device owned by the user A 103. Nodes 1504 and 1505 indicate devices owned by the user B 104. An identifier uniquely defined by the server 107 is given to the nodes 1501 to 1505. An identifier 1 is given to the node 1501. An identifier 2 is given to the node 1502. An identifier 3 is given to the node 1503. An identifier 4 is given to the node 1504. An identifier 5 is given to the node 1505.

Information 1511 is attribute information of the user A 103. Information 1512 is attribute information of the user B 104. Information 1513 to 1515 is attribute information of each device. Attribution information 1521 is an edge indicating the association between the user A 103 and the user B 104. FIGS. 16A and 16B illustrate details of information about the association between nodes managed by the server 107. FIG. 16A illustrates information about the association between the user A 103 (the node 1501) and the user B 104 (the node 1502). The starting node is the identifier 1 of the user A 103. The ending node is the identifier 2 of the user B 104. With respect to the association between the user A 103 and the user B 104, the association type is "FRIEND (PRIVATE)" and the association intensity is "50". The association type "FRIEND" and the association intensity "50" are defined when they are pre-input by either the user A 103 or B 104 and approved by another user. It can be said that the edge 1521 illustrated in FIG. 15 reflects the information illustrated in FIG. 16A. As illustrated in FIG. 16B, the association type may be "BUSINESS" and the association intensity may be "0". The association type may be hierarchized. For example, "BUSINESS" may be subdivided into "SAME SECTION", "SAME DEPARTMENT", "SAME HEADQUARTERS", "SERVICE IN SAME BUSINESS PLACE", "SERVICE IN DIFFERENT BUSINESS PLACE", etc. Similarly, "FRIEND" may be subdivided into "SAME ELEMENTARY SCHOOL", "SAME JUNIOR HIGH SCHOOL", etc. The association intensity for the association between users indicates the degree of intimacy between users.

Returning to FIG. 15, an edge 1522 indicates the association between the user A 103 and devices associated with the user A 103. Edges 1523 and 1524 indicate the associations between the user B 104 and devices associated with the user B 104. FIGS. 17A, 17B, and 17C illustrate details of information about the association between user and device managed by the server 107. FIG. 17A illustrates information about the association between the user A 103 (the node 1501) and a device (the node 1503). The starting node is the identifier 1 of the user A 103 (the node 1501). The ending node is the identifier 3 of the device (the node 1503). The association between the user A 103 and the device indicates that the association type is "OWNED" and "PRIVATE", and the association intensity is "100". FIG. 17B illustrates information about the association between the user B 104 (the node 1502) and a device (the node 1504). The starting node is the identifier 2 of the user B 104 (the node 1502). The ending node is the identifier 4 of the device (the node 1504). The association between the user B 104 and the device indicates that the association type is "RENTAL", "BUSINESS" and the association intensity is "0".

The association type "FRIEND" and the association intensity "50" are defined when the user A 103 or the user B 104 pre-inputs devices owned by respective users and the device attribute information. Although, in the present exemplary embodiment, the association type is "OWNED" and "RENTAL", and "PRIVATE" and "BUSINESS", it is not limited thereto. Although, in the example illustrated in FIG. 15, only the display apparatus 105 is associated with the user A 103, a plurality of devices may be associated therewith. Although two devices are owned by the user B 104, a greater number of devices may be registered. The association intensity for the association between user and device indicates the frequency of using devices by each user.

Details of example user attribute information stored in the database 109 and managed by the server 107 are illustrated in FIGS. 18A ad 18B. FIG. 18A illustrates attribute information of the user A 103. FIG. 18B illustrates attribute information of the user B 104. Referring to the examples illustrated in FIGS. 18A and 18B, the user attribute information includes name, age, gender, hobby, positional information (GPS information), user name for SNS, and password for SNS.

FIGS. 19A, 19B, and 19C illustrate details of the device attribute information stored in the database 109 and managed by the server 107. FIG. 19A illustrates the attribute information of a device (the node 1503) owned by the user A 103. FIG. 19B illustrates the attribute information of a device (the node 1504) owned by the user B 104. FIG. 19C illustrates the attribute information of a device (the node 1505) owned by the user B 104. Referring to the example in FIGS. 19A, 19B, and 19C, the device attribute information includes name, type, connection, state, firmware, available services, positional information (GPS information), owner, place of use, and purpose of use. The device illustrated in FIG. 19A indicates the display apparatus 105.

Although, in the present exemplary embodiment, the databases 108 and 109 are separately arranged, the arrangement is not limited thereto. These databases may be implemented as one database. Further, the user attribute information and device attribute information may be separately stored in different databases. The above-described form of databases according to the present exemplary embodiment is to be considered as an example, and is not limited thereto.

The above-described system configuration is to be considered as an example, and is not limited to the form illustrated in FIG. 1. For example, even if the server 107 includes a plurality of apparatuses, a part or all of processing executed by the server 107 may be executed by the display apparatus 105 and the transmission apparatus 106 on the client side.

Figure 2:
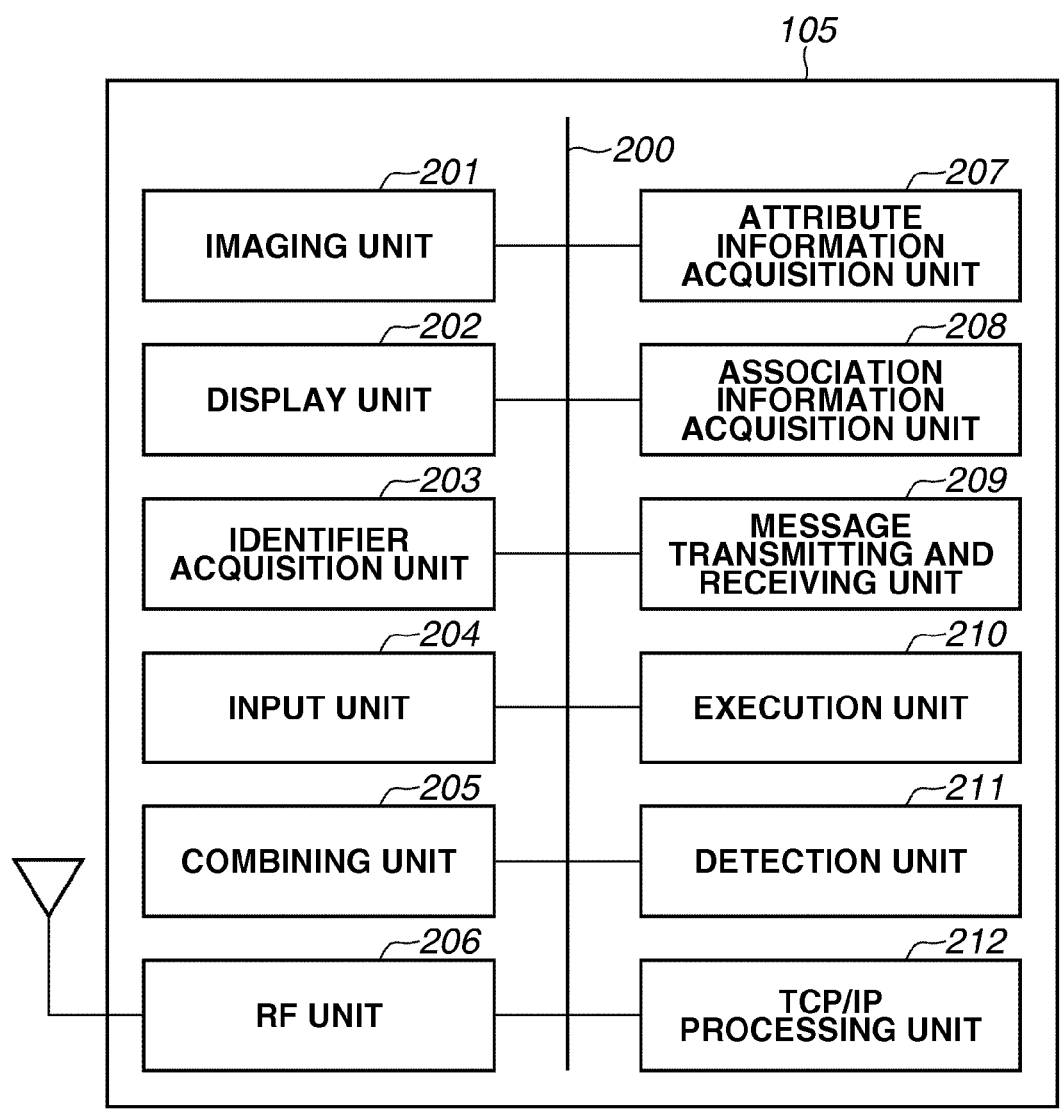
FIG. 2 is a block diagram illustrating a display apparatus according to the present exemplary embodiment.

FIG. 2 is a hardware (module) block diagram illustrating the display apparatus 105 according to the present exemplary embodiment. A part or all of the components may be implemented based on control in which an operation unit, such as a central processing unit (CPU), executes a program to calculate and process information. Further, each component may be implemented when the operation unit executes a program to control hardware.

Referring to FIG. 2, a bus 200 interconnects these components. An imaging unit 201 generates image data of object light captured through a lens. The imaging unit 201 adjusts the angle of view by using optical zoom or digital zoom, and captures an image. A display unit 202 displays images and various information, for example, on a liquid crystal display (LCD) panel. An identifier acquisition unit 203 acquires information about an identifier transmitted by the transmission apparatus 106. An input unit 204 receives the owner's identifier and various user operations. The display unit 202 and the input unit 204 may be integrated into a touch panel.

A combining unit 205 superimposes onto the captured image the association between a subject included in the image captured by the imaging unit 201 and the owner of the display apparatus 105, and a part or all of the subject and device attribute information, acquired from the server. Although, in the present exemplary embodiment, the imaging unit 201 superimposes the attribute information onto the captured image, the processing is not limited thereto. The attribute information may also be superimposed onto an image captured before and a real-time moving image. An RF unit 206 controls an antenna and a circuit for transmitting and receiving wireless signals to/from the transmission apparatus 106 and a wireless base station based on a predetermined wireless communication method (such as the wireless LAN (IEEE802.11 Series, millimeter wave, and Radio Frequency Identification (RFID)). An attribute information acquisition unit 207 acquires from the server 107 the attribute information of another user and devices owned by another user.

An association information acquisition unit 208 acquires from the server 107 the association between the owner of the display apparatus 105 and another user, or the association between another user and devices owned by another user. A message transmitting and receiving unit 209 transmits and receives messages to/from the server 107, and a message via the server 107. In response to an instruction of the user A 103, an execution unit 210 performs processing for acquiring a list of services executable between the user A 103 and the user B 104 from the server 107, and executing a service between the user A 103 and the user B 104, A detection unit 211 detects an object by using the feature information for detecting an object from the captured image. A Transmission Control Protocol/Internet Protocol (TCP/IP) processing unit 212 processes a communication protocol.

Figure 3:
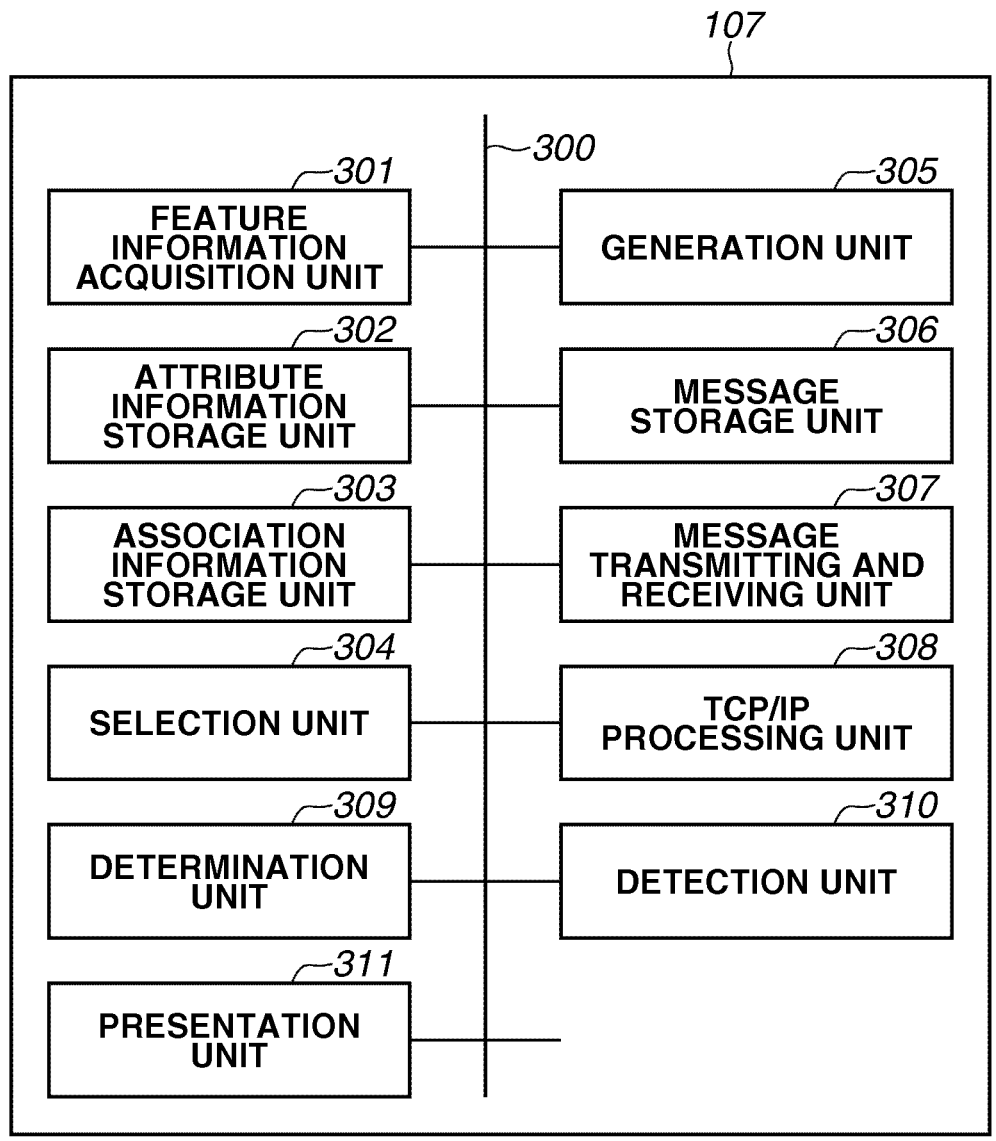
FIG. 3 is a block diagram illustrating a server according to the present exemplary embodiment.

The configuration of the server 107 will be described below. FIG. 3 is a hardware (module) block diagram illustrating the server 107 according to the present exemplary embodiment. A part or all of components may be implemented based on control in which an operation unit, such as a CPU, executes a program to calculate and process information. Further, each component may be implemented when the operation unit executes a program to control hardware.

Referring to FIG. 3, a bus 300 interconnects these components. A feature information storage unit 301 stores the feature information for detecting an object (each user) corresponding to each user, corresponding to the identifier of each user. Although, in the present exemplary embodiment, the feature information storage unit 301 is provided as an independent component, it can be implemented by storing the feature information for each user as one of parameters of the attribute information for each user. The attribute information storage unit 302 store the attribute information corresponding to each identifier (user and device). In the present exemplary embodiment, the attribute information storage unit 302 stores attribute information in the database 109, and performs such operations as addition, updating, and deletion on the database 109. In the present exemplary embodiment, the user (person) attribute information includes name, gender, feature information, GPS information, and login time. The device attribute information includes name, type, connection, status, firmware, available service, positional information (GPS information), owner, place of use, and purpose of use.

The association information storage unit 303 stores the association between users and the association between user and device. In the present exemplary embodiment, the association information storage unit 303 stores associations in the database 108, and performs such operations as addition, updating, and deletion on the database 108. In the present exemplary embodiment, an association includes the association type (FRIEND, BUSINESS, COWORKER, FAMILY, etc.) and the association intensity. The association intensity between users indicates the intimacy between users. The association intensity between user and device indicates the frequency of using devices by each user.

A selection unit 304 selects a device for executing a service based on the association between users, the association between another user and devices owned by another user, and the attribute information of devices owned by another user, when execution of a service with another user is requested by the user. The selection unit 304 is also provided with a function of, after a device for executing the relevant service is determined, supervising the device attribute information to determine whether the device has become ready to execute the relevant service. In response to a request from a user, a service list generation unit 305 generates a list of services executable between the relevant user and another user.

If the server 107 could not immediately execute processing in response to a message received from the display apparatus 105, a message storage unit 306 stores the relevant message. A message transmitting and receiving unit 307 transmits and receives predetermined messages to/from the display apparatus 105 and the transmission apparatus 106. A TCP/IP processing unit 308 performs network protocol processing.

A determination unit 309 determines whether there exists an association between users who requested service execution. An execution unit 310 performs processing for executing the relevant service specified by a device between users who requested service execution. A presentation unit 311 presents the generated service list to the user (device associated with the user).

The hardware (module) configuration of the transmission apparatus 106 will be described below with reference to FIG. 4.

Figure 4:
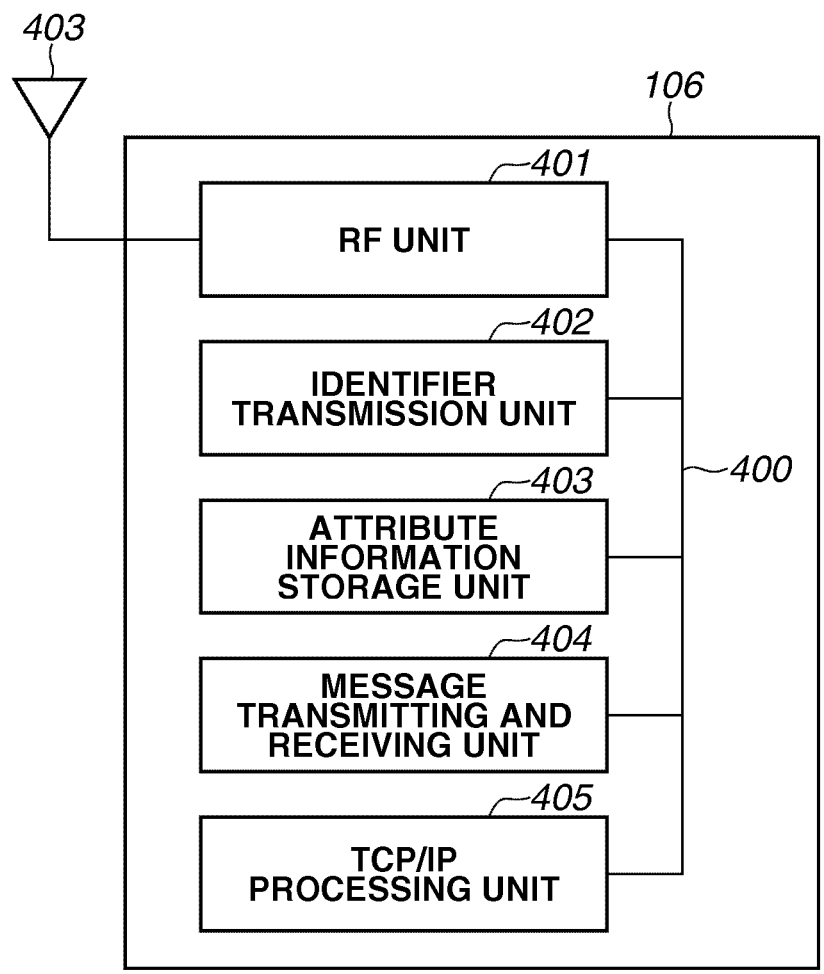
FIG. 4 is a block diagram illustrating a transmission apparatus according to the present exemplary embodiment.

Referring to FIG. 4, a bus 400 interconnects these modules. An RF unit 401 controls an antenna and a circuit for transmitting and receiving wireless signals to/from the display apparatus 105 and a wireless base station based on a predetermined wireless communication method (such as the wireless LAN, millimeter wave, and RFID). An identifier transmission unit 402 transmits the identifier (user ID and account ID) of the owner (the user B 104). Upon reception of an input by the user B 104 via a user interface, the identifier of the user B 104 is registered in the identifier transmission unit 402. An association between an identifier and the user B 104, set at the time of factory shipment and stored in the server 107 may be handled as an alternative of the identifier of the user B 104.

An attribute information storage unit 403 stores the attribute information (name, gender, feature information, GPS information, login time, etc.) of the user B 104. The attribute information such as name and gender is pre-input by the user B 104. When the transmission apparatus 106 is provided with a sensor, such as the global positioning system (GPS), it outputs acquired positional information as attribute information of the user B 104. A message transmitting and receiving unit 404 transmits and receives control messages to/from the server 107. A TCP/IP processing unit 405 performs network protocol processing.

Figure 5A:
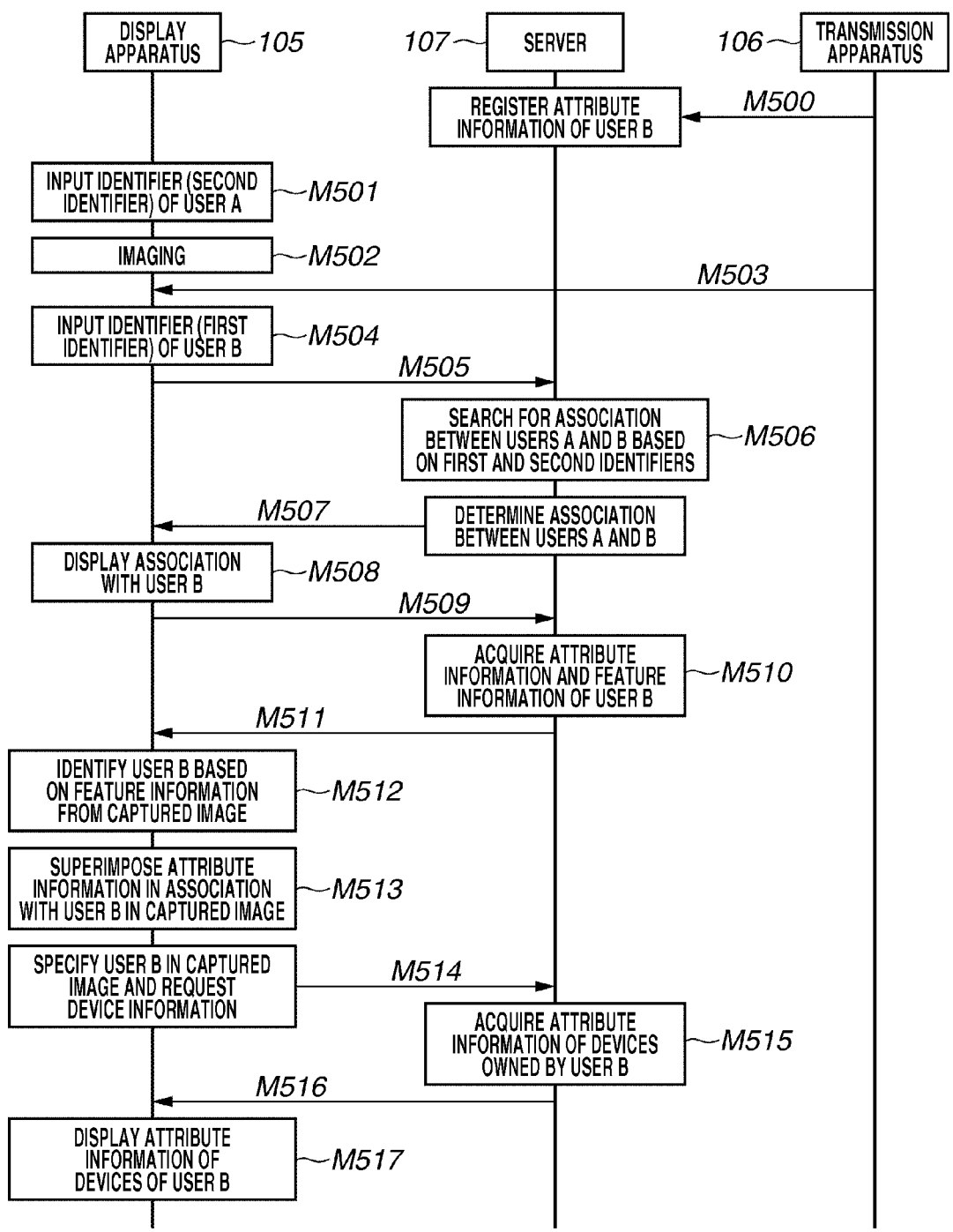
FIG. 5A is a sequence diagram illustrating processing performed by the present information processing system to execute a service between users.
Figure 5B:
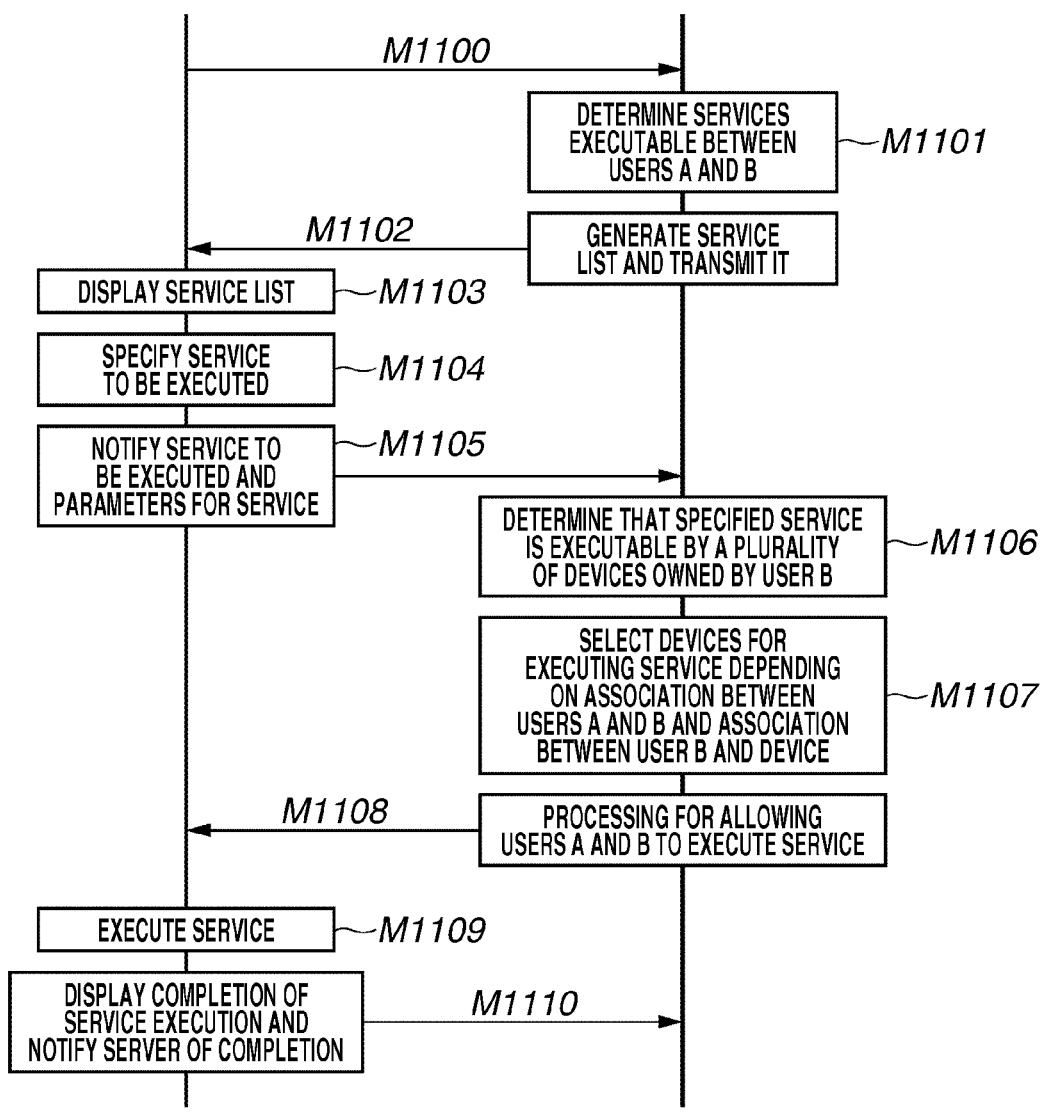
FIG. 5B is a sequence diagram illustrating processing performed by the present information processing system to execute a service between users.

Operations of the above-described information processing system will be described below. FIGS. 5A and 5B are a sequence diagram illustrating processing for executing a service between the user A 103 and the user B 104 in the present information processing system. Referring to FIG. 5A, in step M500, the transmission apparatus 106 performs processing for associating the attribute information of the user B 104 with the identifier of the user B 104 and registering (updating) the association in the server 107. The server 107 instructs the feature information storage unit 301 to store the feature information out of the received attribute information of the user B 104. The server 107 instructs the attribute information storage unit 302 to store other attribute information. Although, in the present exemplary embodiment, the feature information storage unit 301 and the attribute information storage unit 302 are separated, they may be managed as one unit. This processing will be further described below with reference to the flowchart illustrated in FIG. 7.

In step M501, the display apparatus 105 acquires the identifier of the user A 103 based on an operation by the user A 103. As a result, the user A 103 can utilize the present processing system. The attribute information of the user A 103 has been preregistered in the servers 107. In step M502, the imaging unit 201 of the display apparatus 105 captures an image of the user B 104. The user A 103 specifies a partner to communicate with by capturing an image of the partner. In step M503, the identifier transmission unit 402 of the transmission apparatus 106 transmits the identifier of the user B 104. Although, in the present exemplary embodiment, the identifier transmission unit 402 performs transmission processing based on a predetermined wireless communication method (such as wireless LAN, millimeter wave, and RFID), the wireless communication method is not limited thereto. Any communication method may be applied as long as the identifier can be transmitted.

In step M504, the identifier acquisition unit 203 of the display apparatus 105 receives the identifier of the user B 104 transmitted by the transmission apparatus 106. Although, in the present exemplary embodiment, the display apparatus 105 receives the identifier after image acquisition (a sequence from step M502 to step M504), the processing is not limited thereto. The display apparatus 105 may receive the identifier before image acquisition or simultaneously with image acquisition. In step M505, the message transmitting and receiving unit 209 of the display apparatus 105 transmits to the server 107 a message inquiring of the server 107 about the association between the user A 103 and the user B 104 including the identifier of the user A 103 and the acquired identifier of the user B 104.

In step M506, the server 107 receives from the display apparatus 105 the message requesting to acquire the association between the user A 103 and the user B 104. Then, the server 107 searches, in the database 109, for an association between the user A 103 and the user B 104 by using the received identifier of the user A 103 and the identifier of the user B 104. An association refers to the association type (FRIEND and BUSINESS) and the association intensity (−100 to 100) (equivalent to the edge 1521 illustrated in FIG. 15).

In step M507, the determination unit 309 of the server 107 determines whether there exists an association between the user A 103 and the user B 104 based on the result of the search. If the association between the user A 103 and the user B 104 has been constructed, the server 107 determines to present the attribute information of the user B 104 to the user A 103. In other words, the server 107 permits the user A 103 to access the attribute information of the user B 104, and determines to provide the user A 103 with the attribute information of the user B 104. The present sequence will be described on the premise that the association between the user A 103 and the user B 104 has been constructed, and that the determination unit 309 has determined that there exists an association between the user A 103 and the user B 104. When the determination unit 309 determines that there exists an association between users, the message transmitting and receiving unit 307 transmits information about the association between the user A 103 and the user B 104 to the display apparatus 105. On the other hand, when the determination unit 309 determines that exists no association between the user A 103 and the user B 104, the message transmitting and receiving unit 307 transmits an error message to the display apparatus 105, and does not perform the subsequent processing. Specifically, the server 107 does not present the attribute information of users having no association with each other. The server 107 performs control to prevent users having no association with each other from executing any service. Operations performed by the server 107 in steps M506 to M508 will be described in detail below with reference to the flowchart illustrated in FIG. 8.

In step M508, upon reception of the information about the association between the user A 103 and the user B 104 transmitted from the server 107, the display unit 202 of the display apparatus 105 displays the received information. In step M509, upon detection of the association between the user A 103 and the user B 104, the display apparatus 105 transmits to the server 107 a message requesting the attribute information of the user B 104 including the identifier of the user B 104, via the message transmitting and receiving unit 209. In step M510, the server 107 receives the message requesting the attribute information of the user B 104 from the display apparatus 105. Then, by using the identifier of the user B 104, the server 107 searches, in the database 108, for the attribute information and feature information (searches for the attribute information 1512 by using the identifier of the node 1502 as a key).

In step M511, the server 107 transmits the attribute information of the user B 104 to the display apparatus 105. Although, in the present exemplary embodiment, the display apparatus 105 separately acquires the association between the user A 103 and the user B 104 and the attribute information of the user B 104, and displays them in this order, the processing is not limited thereto. The association and the attribute information may be acquired simultaneously or in reverse order. In step M512, the display apparatus 105 extracts the received feature information of the user B 104. The detection unit 211 of the display apparatus 105 identifies the user B 104 (an object corresponding to the acquired feature information) from the captured image by using the feature information.

In step M513, when the display apparatus 105 determines that the user B 104 has been detected and identified from the captured image, the combining unit 205 superimposes onto the captured image the attribute information acquired in association with the user B in the captured image to generate a combined image. The display unit 202 displays the combined image. Although, in the present exemplary embodiment, the attribute information is superimposed onto the image, the processing is not limited thereto. The attribute information may be displayed on another screen. In step M514, upon detection of a predetermined operation for specifying the user B whose attribute information is displayed in the captured image from the user A 103, the display apparatus 105 transmits to the server 107 a message requesting the attribute information of devices owned by the user B 104. The identifier of the user B 104 is included in this message.

In step M515, the server 107 receives the message requesting to acquire the attribute information of devices owned by the user B 104. The server 107 acquires the association of devices owned by the user B 104 from the database 109 (the edges 1523 and 1524). The server 107 acquires the attribute information of devices owned by the user B 104 from the database 108. In step M516, the server 107 transmits the attribute information of devices owned by the user B 104 to the display apparatus 105. In step M517, the display apparatus 105 superimposes on the image the attribute information of devices owned by the user B 104, and displays the combined image. As the device attribute information, the display apparatus 105 displays, for example, presence information indicating whether the devices are online or not. Alternatively, the display apparatus 105 may display icons indicating device types. Displaying the attribute information of devices owned by another user in the neighborhood enables grasping what devices are owned by another user, making it possible to determine whether communication with another user is to be performed via a device.

Although, in the present exemplary embodiment, the attribute information is superimposed onto the image, the processing is not limited thereto. The device attribute information may be displayed on another screen. Although, in the present exemplary embodiment, the attribute information of devices owned by the user B 104 is directly acquired, the processing is not limited thereto. It may be also possible to acquire a list of devices owned by the user B 104 first, and then acquire the attribute information of each device included in the list. Operations of the display apparatus 105 in steps M501 to M517 will be described in detail below with reference to the flowchart illustrated in FIG. 6. Although omitted in FIG. 5, a list of devices owned by the user A 103 and the attribute information of these devices can be acquired in a similar way.

Referring to FIG. 5B, suppose that, in step M1100, the user A 103 wants to execute a predetermined service between the user A 103 and the user B 104 by using a device of the user B 104. Upon detection of an instruction from the user A 103, the display apparatus 105 transmits to the server 107 a message requesting the generation of a list of services available between the user A 103 and the user B 104. In step M1101, upon reception of the service list generation request, the generation unit 305 of the server 107 acquires the attribute information of devices owned by the user A 103 and the attribute information of devices owned by the user B 104. The server 107 compares the attribute information of devices owned by the user A 103 with the attribute information of devices owned by the user B to determine whether any service is available between devices of the two users.

FIGS. 21A and 21B illustrate the device attribute information used when the server 107 generates a service list. FIGS. 21A and 21B are table data illustrating in list form available services extracted from the attribute information of each device illustrated in FIG. 15. FIG. 21A illustrates a list of devices owned by the user A 103 and services executable by the devices. FIG. 21B illustrates a list of devices owned by the user B 104 and services executable by the devices. Referring to FIG. 21A, the message service (the message exchange service), image exchange service, and print service (transmission) are available to the device (the display apparatus 105) of the user A 103. Referring to FIG. 21B, the message service and print service (printing) are available to the node 1504 (one node of the device group 110) of the user B 104, and the message service and image exchange service are available to the node 1505 (one node of the device group 110) of the user B 104.

Referring to the example illustrated in FIGS. 21A and 21B, the print service and message service are available to the device (the display apparatus 105) of the user A 103 and the node 1504 of the user B 104. The message service and image exchange service are available to the device (the display apparatus 105) of the user A 103 and the node 1505 of the user B 104.

Therefore, the server 107 determines that the message service, image exchange service, and print service are executable between the user A 103 and the user B 104. In this case, even if a device is capable of executing a certain service, the executable service may be restricted depending on the association between the user A 103 and the user B 104. For example, when the association between the user A 103 and the user B 104 is "FAMILY", the print service is permitted; otherwise, the print service is not permitted. Further, when the association between users is "FRIEND", executable services may be restricted only to the message service. Further, it is also possible to specify for each device a service execution condition (rule) depending on the association. For example, when the device attribute information (the association between user and device) is "BUSINESS", services may be permitted only when the association between users is "BUSINESS".

Further, even if a device is capable of executing a certain service, the executable service may be restricted depending on the association intensity between the user A 103 and the user B 104. Similar restriction can be applied to the attribute information (the attribute information 1511) of the user A 103 and the attribute information (the attribute information 1512) of the user B 104. Further, executable services may be restricted depending on the association between the user A 103 and devices and the association between user and device. For example, when the association between user and device is "RENTAL", only services using the device may be inhibited or only specific services may be permitted.

In step M1102, the server 107 generates a list of services determined in step M1101 to be executable between the user A 103 and the user B 104 based on the devices owned by the user B 104, and transmits the service list to the display apparatus 105. Specifically, referring to the example illustrated in FIG. 5, the server 107 generates a service list for "print service, message service, and image exchange service from user A 103", and transmits the service list to the display apparatus 105.

In step M1103, when the display apparatus 105 receives the service list from the server 107, the display unit 202 of the display apparatus 105 displays the received service list. In step M1104, based on a user operation, the display apparatus 105 determines a service to be executed between the user A 103 and the user B 104. Based on the service list, the user A 103 specifies a service to be executed via the user interface. Further, it is also possible to give priority to a service, and automatically determine a service to be executed.

In step M1105, the display apparatus 105 notifies the server 107 of the service to be executed and parameters for the service. In step M1106, the server 107 determines whether the notified service is executable by a plurality of devices owned by the user B 104. When the notified service is not executable by the plurality of devices owned by the user B (when the notified service is executable by one device out of the devices owned by the user B), the server 107 performs processing for executing the notified service between the user A 103 and the user B 104.

Specifically, out of the devices owned by the display apparatus 105 and the user B 104, the notified service is executed between the devices capable of executing the service.

In the present exemplary embodiment, the notified service is determined to be executable by a plurality of devices. In step M1107, the selection unit 304 of the server 107 selects a device for executing the relevant service based on the association between the user A 103 and the user B 104, and the association between the user B 104 and the device. Suppose that the "message service" is specified in step M1104. As described above, the "message service" is executable between the display apparatus 105 (the node 1503) and the node 1504, and between the display apparatus 105 and the node 1505. The association between the user A 103 and the user B 104 is "FRIEND (PRIVATE)", as illustrated in FIG. 16A. The association between the user B 104 and the node 1504 is "RENTAL" and "BUSINESS", as illustrated in FIG. 17B. Specifically, FIG. 17B illustrates that the user B 104 uses the node 1504 for business use without having ownership thereof (i.e., on a joint use or rental basis). Further, the association between the user B 104 and the node 1505 is "OWNED" and "PRIVATE", as illustrated in FIG. 17C. Specifically, FIG. 17C illustrates that the user B 104 has ownership of the node 1505, and uses it for private use.

Although the association between the user A 103 and the user B 104 is "FRIEND (PRIVATE)", it is not suitable that the user A 103 sends a message to a device used by the user B 104 for business use. Therefore, in the present exemplary embodiment, the selection unit 304 of the server 107 selects a device having an attribute (an association with the user) corresponding to the association between users. Specifically, the selection unit 304 of the server 107 selects as a device for executing the relevant service the node 1505 having the association "FRIEND (PRIVATE)" with the user B corresponding to the association "PRIVATE" between the user A 103 and the user B 104. The device attribute (the association between device and user) corresponding to the association between users, which is used for selecting the device for executing the relevant service, is predefined.

Further, the selection unit 304 of the server 107 may determine the execution of the service depending on the presence of the device of the partner (whether the device is connected to the network). For example, if the target device is offline, the selection unit 304 may preferentially select other online device instead of the target offline device, attaching importance to real-time processing of the service. Further, the selection unit 304 may store the information about the selected device and execute the relevant service when the device becomes online.

When there exists a plurality of devices capable of executing the service corresponding to the association between users, the selection unit 304 selects one device for executing the relevant service based on another association between user and device. For example, the selection unit 304 may select a device having the association "OWNED" between user and device in preference to a device having the association "RENTAL" between user and device. When there exists a plurality of devices capable of executing the service corresponding to the association between users, the selection unit 304 may select one device for executing the relevant service based on the association intensity (frequency of use) between user and device. For example, the selection unit 304 may select a device having the highest association intensity (frequency of use) with the user out of the plurality of devices capable of executing the service corresponding to the association between users.

In step M1108, the execution unit 310 of the server 107 performs processing for executing the relevant service between the user A 103 and the user B 104. The execution unit 310 instructs the node 1503 (the display apparatus 105) to transmit a message. In this case, the execution unit 310 also instructs the node 1503 about a message transmission destination (information about a channel to the node 1504). The server 107 instructs the selected node 1504 to receive a message via the message service. The instruction can be achieved by the Simple Object Access Protocol (SOAP), Representational State Transfer (REST), and various types of remote procedure call (RPC). Further, the execution unit 310 may relay a message from the node 1503 (the display apparatus 105) to the node 1504. The execution unit 310 can perform similar processing also during execution of other services (the image exchange service and print service). In step M1109, in response to the instruction from the server 107, the execution unit 210 of the display apparatus 105 executes the relevant service on a device corresponding to the user B 104. When service execution is completed, in step M1110, the display apparatus 105 displays the completion of the service, and notifies the server 107 of the completion of the service. When the partner device is offline, the server 107 may notify the display apparatus 105 that it is waiting for execution of the service.

If a device corresponding to the user A 103 other than the display apparatus 105 is selected as a device for executing the relevant service, when the server 107 is notified of the completion of the service from the selected device, the server 107 notifies the display apparatus 105 of the completion of the service. The display apparatus 105 displays a message indicating that the service execution is completed.

Figure 20A:
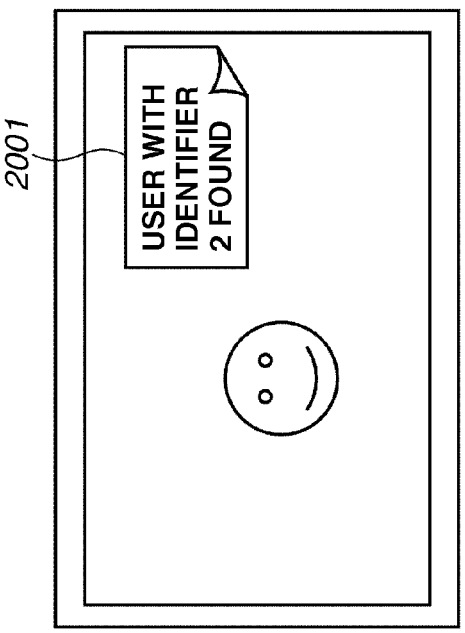
FIGS. 20, 20B, 20C, and 20D illustrate example screens displayed on the display apparatus.
Figure 20B:
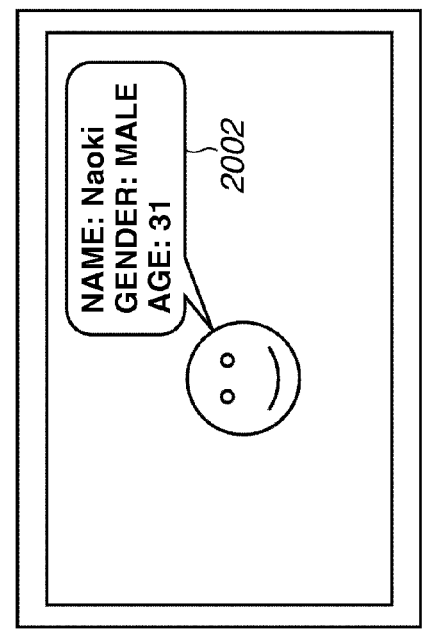

Example screens displayed by the display unit 202 of the display apparatus 105 in the above-described processing are illustrated in FIGS. 20A, 20B, 20C, and 20D. FIG. 20A illustrates a screen displayed by the display apparatus 105 when the identifier of the user B 104 is detected (M504). A pop-up 2001 indicates that the identifier of the user B 104 has been detected. Although, in the present exemplary embodiment, the identifier is superimposed onto an image like a pop-up, the processing is not limited thereto. The identifier may be displayed on another screen or notified with other method, such as sound. FIG. 20B illustrates a screen displayed by the display apparatus 105 when the user B 104 is identified (M513). A pop-up 2002 displays the attribute information of the user B 104 (a part of the information illustrated in FIG. 18B). This pop-up displays a part or all of the attribute information of the user B 104. Although, in the present exemplary embodiment, the attribute information is superimposed onto an image like a pop-up, the processing is not limited thereto. The attribute information may be displayed on another screen or notified with other method, such as sound.

Figure 20C:
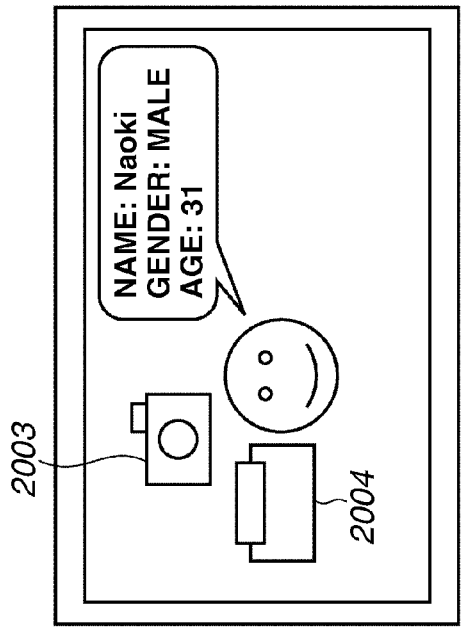

FIG. 20C illustrates a screen of the devices owned by the user B 104 displayed by the display apparatus 105 (M517). A device 2003 is a device owned by the user B 104 (the node 1504). The display apparatus 105 changes the screen display according to the attribute information of the device 2003 (the node 1504). Since the device 2003 is connected online and in an unavailable state, the icon of the device 2003 is displayed in gray. A device 2004 is a device owned by the user B 104 (the node 1505). Since the device 2004 is connected online and in an available state, the icon of the device 2004 is highlighted. The display apparatus 105 displays the device attribute information in an identifiable way. Although, in the present exemplary embodiment, device icons are changed according to the connection and state, the processing is not limited thereto. Other information may be superimposed onto the image.

Figure 20D:
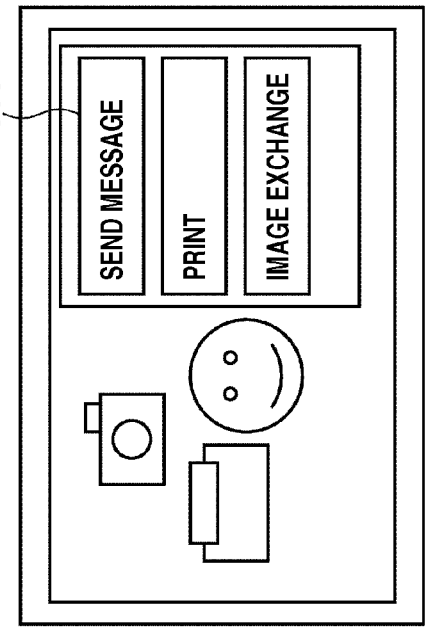

FIG. 20D illustrates a screen displaying a list of services executable between the user A 103 and the user B 104 on the display apparatus 105 (M1103). A service 2005 is a service executable between the user A 103 and the user B 104. The user A 103 selects a service from the displayed service list, and instructs execution of the service (M1104).

The above-described operations of the present information processing system enable executing of a service between a user A and a user B. According to operations of the present information processing system, the present information processing system transmits attribute information and executes a service between users only when there exists an association between the relevant users, thus achieving security control for preventing execution of services involving random disclosure of personal information or access to resources of a user's apparatus, by another user. Further, depending on the association between users and the association between user and device, the present information processing system enables selecting of a more suitable device as a device for executing a service, without user operations on a device for executing the relevant service. Thus, the user can perform communication by using a suitable device out of a plurality of devices without complicated operations, which effects improvement in usability.

In the present exemplary embodiment, the display apparatus 105 acquires the identifier of another user from the transmission apparatus 106 by using a wireless signal, however, the display apparatus 105 may acquire the identifier input by a user to the display apparatus 105. Although, in the present exemplary embodiment, the display apparatus 105 requests the server 107 to send a service list by specifying a partner user from the captured image, this processing may be omitted. Specifically, steps M512 to M517 (FIG. 5) may be omitted, and the display apparatus 105 may only request a service list. (The display apparatus 105 may request the server 107 to send a service list upon acquisition of the identifier of another user.)

Now, processing performed by each apparatus of the present information processing system will be described by flowcharts. FIG. 6 is a flowchart illustrating processing performed by the display apparatus 105 to receive the identifier of the user B 104 from the transmission apparatus 106 and request the server 107 to send information.

In step S601, the input unit 204 receives an input of the identifier of the user A 103. Then, the processing proceeds to step S602. In step S602, an imaging unit 201 captures an image and the processing proceeds to step S603. In step S602, an RF unit 206 is connected by a predetermined wireless method to the transmission apparatus 106. An identifier acquisition unit acquires an identifier of the user B 104 transmitted from the transmission apparatus 106. A combining unit 205 superimposes the identifier of the user B 104 on the image and displays them (FIG. 20A). Then, the processing proceeds to step S604. In step S604, an association information acquisition unit 208 generates a message requesting acquisition of the association between the user A 103 and the user B 104 including the identifiers of the user A 103 and the user B 104. A message transmitting and receiving unit 209 transmits the above-described message to the server 107 via a TCP/IP processing unit 212. The message transmitting and receiving unit 209 acquires the association between the user A 103 and the user B 104 from the sever 107, and transmits it to an association information acquisition unit 208. Then, the processing proceeds to step S605. In step S605, the combining unit 205 displays the association between the user A 103 and the user B 104 on the captured image. Then, the processing proceeds to step S606.

In step S606, the attribute information acquisition unit 207 generates a message for acquiring the attribute information of the user B 104 including the identifier of the user B 104. The message transmitting and receiving unit 209 transmits the above-described message to the server 107 via the TCP/IP processing unit 212. The message transmitting and receiving unit 209 acquires the attribute information of the user B 104 from the sever 107, and transmits it to the attribute information acquisition unit 207. Then, the processing proceeds to step S607. In step S607, the detection unit 211 acquires the feature information of the user B 104 from the above-described attribute information, and determines whether the user B 104 exists in the captured image. When the detection unit 211 determines that the user B 104 exists in the image (PRESENT in step S607), the processing proceeds to step S608. On the other hand, when the detection unit 211 determines that the user B 104 does not exist on the image (NOT PRESENT in step S607), the processing exits the flowchart.

In step S608, the combining unit 205 displays the attribute information of the user B 104 in the vicinity of the user B 104 (FIG. 20B). Then, the processing proceeds to step S609. In step S609, the attribute information acquisition unit 207 generates a message for acquiring the identifier and attribute information of the device associated with the user B 104. The message transmitting and receiving unit 209 transmits the above-described message by using the TCP/IP processing unit 212. The message transmitting and receiving unit 209 acquires the identifier and attribute information of the device associated with the user B 104 from the sever 107, and transmits them to the attribute information acquisition unit 207. Then, the processing proceeds to step S610.

In step S610, the combining unit 205 superimposes on the image the device associated with the user B 104 and a part or all of the attribute information of the device and display them (FIG. 20C). Then, the processing proceeds to step S611. Although, in the present exemplary embodiment, the attribute information is superimposed onto the image, the processing is not limited thereto. The device attribute information may be displayed on another screen.

In step S611, the attribute information acquisition unit 207 generates a message for acquiring the identifier and attribute information of the device associated with the user A 103. The message transmitting and receiving unit 209 transmits the above-described message via the TCP/IP processing unit 212. The message transmitting and receiving unit 209 of the server 107 acquires the identifier and attribute information of the device associated with the user A 103, and transmits them to the attribute information acquisition unit 207. Then, the processing proceeds to step S612.

In step S612, the combining unit 205 superimposes on the image a part or all of the device associated with the user A 103 and the attribute information of the device (FIG. 20D) and display them. Then, the processing exits the flowchart. Although, in the present exemplary embodiment, the attribute information is superimposed onto the image, the processing is not limited thereto. The attribute information may be displayed on another screen.

Figure 7:
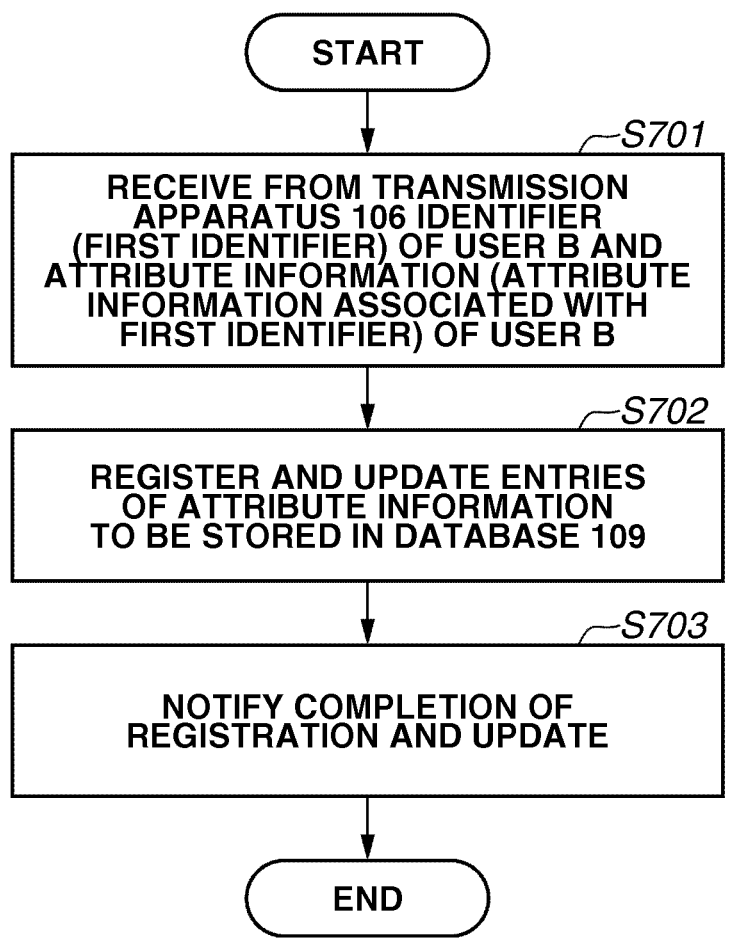
FIG. 7 is a flowchart illustrating processing performed by the server to receive an identifier and attribute information from the transmission apparatus and update database entries.

FIG. 7 is a flowchart illustrating processing performed by the server 107 to register or update information in response to a message from the transmission apparatus 106. In step S701, the message transmitting and receiving unit 307 receives a message from the transmission apparatus 106 via the TCP/IP processing unit 308. Then, the processing proceeds to step S702. In step S702, the message transmitting and receiving unit 307 requests the attribute information storage unit 302 to store the identifier of the user B 104, the attribute information of the user B 104, the device corresponding to the user B 104, and the attribute information of the device. When relevant information has changed, the attribute information storage unit 302 updates the attribute information associated with the user B 104 in the database 108. The message transmitting and receiving unit 307 requests the feature information storage unit 301 to store the identifier of the user B 104, and the feature information included in the attribute information of the user B 104. When relevant information has changed, the feature information storage unit 301 updates the feature information associated with the identifier of the user B 104 in the database 109. Then, the processing proceeds to step S703. In step S703, the message transmitting and receiving unit 307 notifies the transmission apparatus 106 of the completion of update.

Then, the processing exits the flowchart. Although only update of the attribute information has specifically been described above, acquisition, addition, and deletion of the attribute information can also be performed.

Figure 8:
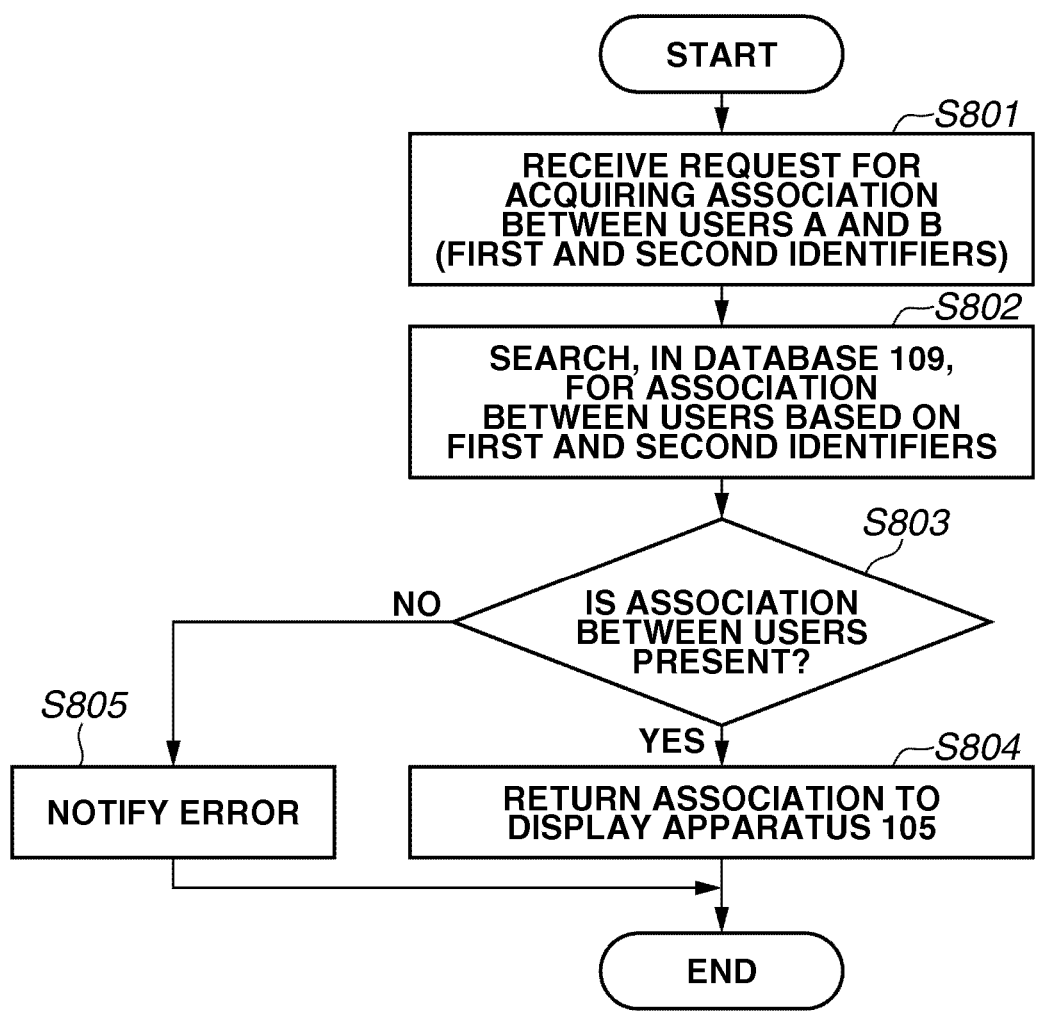
FIG. 8 is a flowchart illustrating processing performed by the server when a request for acquiring an identifier and an association with the identifier is received from the display apparatus.

FIG. 8 is a flowchart illustrating processing performed by the server 107 when a request for acquiring the association between users is received from the display apparatus 105. In step S801, the message transmitting and receiving unit 307 receives a message from the display apparatus 105 via the TCP/IP processing unit 308. Then, the processing proceeds to step S802. In step S802, the message transmitting and receiving unit 307 requests the association information storage unit 303 to acquire the association between users based on the identifier of the user A 103 and the identifier of the user B 104. The association information storage unit 303 searches, in the database 109, for a corresponding association by using the identifier of the user A 103 and the identifier of the user B 104 as a key. In step S803, the determination unit 309 determines whether there exists an association between the user A 103 and the user B 104. When the determination unit 309 determines that there exists an association (YES in step S803), then in step S804, the presentation unit 311 transmits the association (the edge 1521) of the user A 103 and the user B 104 to the display apparatus 105 via the message transmitting and receiving unit 307. Then, the processing exits the flowchart. When the determination unit 309 determines that there is no association (NO in step S803), then in step S805, the message transmitting and receiving unit 307 notifies the display apparatus 105 of an error. Then, the processing exits the flowchart. Although only acquisition of the association has specifically been described above in similar processing, addition, deletion, and update of the association can also be performed.

Figure 9:
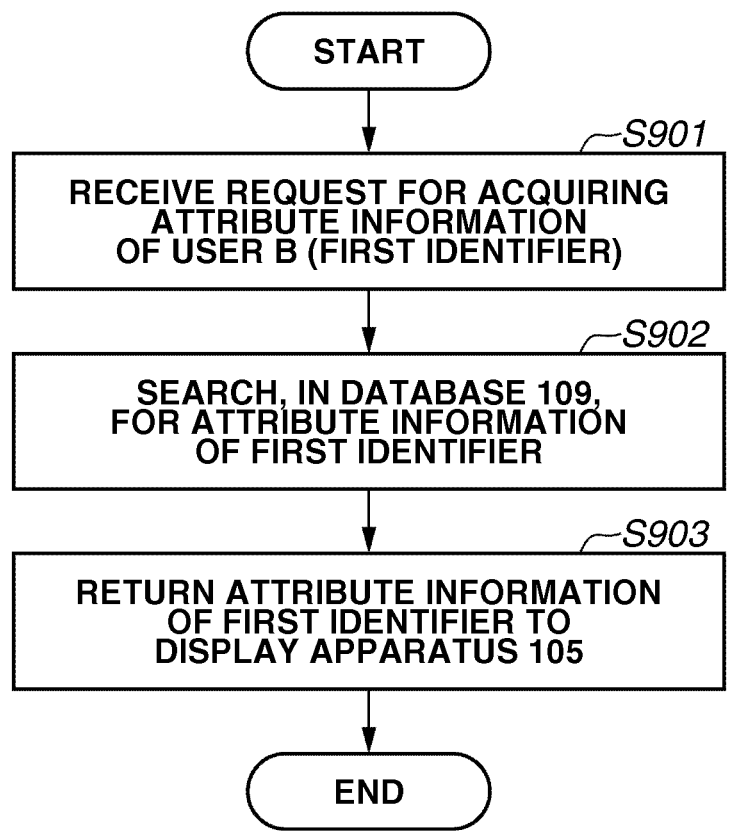
FIG. 9 is a flowchart illustrating processing performed by the server to provide the display apparatus with the attribute information.

FIG. 9 is a flowchart illustrating processing performed by the server 107 when a request for acquiring the attribute information associated with the identifier is received from the display apparatus 105. In step S901, the message transmitting and receiving unit 307 receives a message from the display apparatus 105 via the TCP/IP processing unit 308. Then, the processing proceeds to step S902. In step S902, the message transmitting and receiving unit 307 requests the attribute information storage unit 302 to acquire the attribute information of the user B 104. The attribute information storage unit 302 searches, in the database 108, for the attribute information of the user B 104 by using the identifier of the user B 104 as a key. In step S903, the message transmitting and receiving unit 307 transmits the attribute information (the attribute information 1512) of the user B 104 to the display apparatus 105. Then, the processing exits the flowchart. If the target information is not found in the search, the message transmitting and receiving unit 307 transmits an error message to the display apparatus 105.

FIG. 10 is a flowchart illustrating processing performed by the server 107 when a request for acquiring a device list is received from the display apparatus 105. In step S1001, the message transmitting and receiving unit 307 receives a message from the display apparatus 105 via the TCP/IP processing unit 308. In step S1002, the message transmitting and receiving unit 307 requests the association information storage unit 303 to acquire a device associated with the user B 104 and the association between the relevant device and the user B 104. The association information storage unit 303 searches, in the database 108, for a device list and the association of the user B 104 by using the identifier of the user B 104 as a key. Then, the processing proceeds to step S1003. In step S1003, the message transmitting and receiving unit 307 extracts the identifier of the device from the device list of the user B 104, and requests the attribute information storage unit 302 to acquire the attribute information of the device. The attribute information storage unit 302 searches, in the database 108, for the attribute information of each device by using the identifier of the device as a key. The attribute information storage unit 302 applies the relevant processing to all of the devices in the device list. In step S1004, the message transmitting and receiving unit 307 transmits to the display apparatus 105 the device identifier (the nodes 1504 and 1505) and association (the edges 1523 and 1524), and the attribute information (attribute information 1514 and 1515) of each device.

Figure 12:
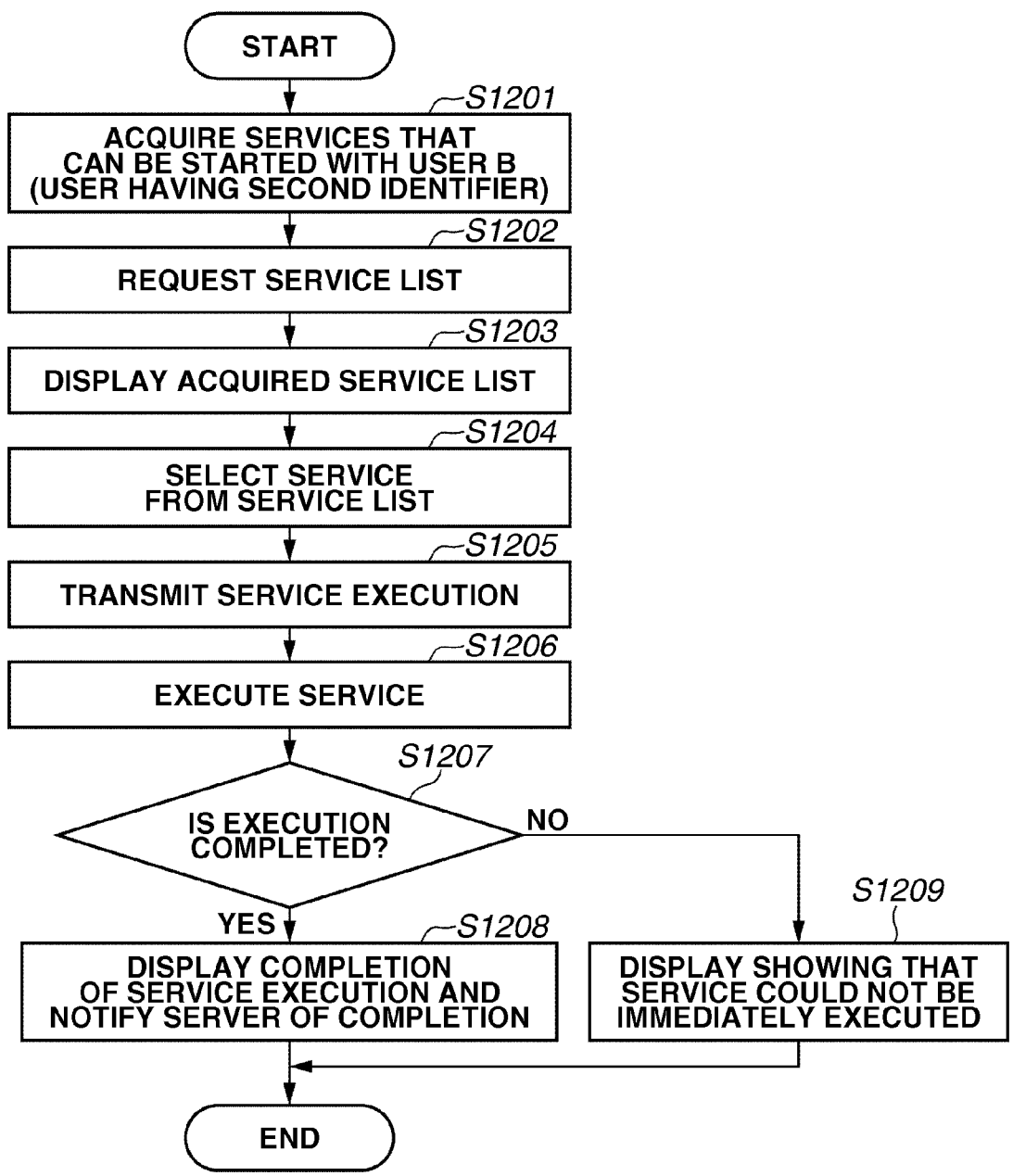
FIG. 12 is a flowchart illustrating processing performed by the display apparatus to request service list acquisition and request service execution.

FIG. 12 is a flowchart illustrating processing performed by the display apparatus 105 to request the server 107 to send a service list and request the server 107 to execute the relevant service. In step S1201, the input unit 204 receives from the user A 103 a request for acquiring a service which can be started with the user B 104. The execution unit 210 generates a message requesting the server 107 to acquire a list of services executable between the user A 103 and the user B 104. The message transmitting and receiving unit 209 transmits to the server 107 via the TCP/IP processing unit 212 the message requesting the server 107 to acquire a service list. In step S1202, the message transmitting and receiving unit 209 receives the message of a service list from the server 107 via the TCP/IP processing unit 212. In step S1203, the combining unit 205 displays the received service list. The combining unit 205 superimposes the service list onto the image. Although, in the present exemplary embodiment, the combining unit 205 superimposes the service list onto the image, the processing is not limited thereto. The service list may be displayed on another screen or as a pop-up.

In step S1204, the input unit 204 detects a touch on a service to be executed, from the service list displayed by the user A 103 on the display unit 202 to select the service. Then, the processing proceeds to step S1205. Although, in the present exemplary embodiment, the user A 103 selects a service via the user interface, the processing is not limited thereto. The display apparatus 105 may autonomously select a service. In step S1205, the execution unit 210 generates a message requesting the server 107 to execute the selected service. The message transmitting and receiving unit 209 transmits to the server 107 via the TCP/IP processing unit 212 a message requesting the server 107 to execute the relevant service. In step S1206, the execution unit 210 performs processing for executing the relevant service in response to an instruction from the server 107. In step S1207, the execution unit 210 determines whether the service execution is completed. When the execution unit 210 determines that the service execution is not completed (NO in step S1207), the processing proceeds to step S1209. When the execution unit 210 determines that the service execution is completed (YES in step S1207), then in step S1208, the combining unit 205 displays the completion of the service execution, and notifies the server 107 of the completion of the service. In step S1209, the combining unit 205 displays a message indicating that the service could not be immediately executed.

Figure 13:
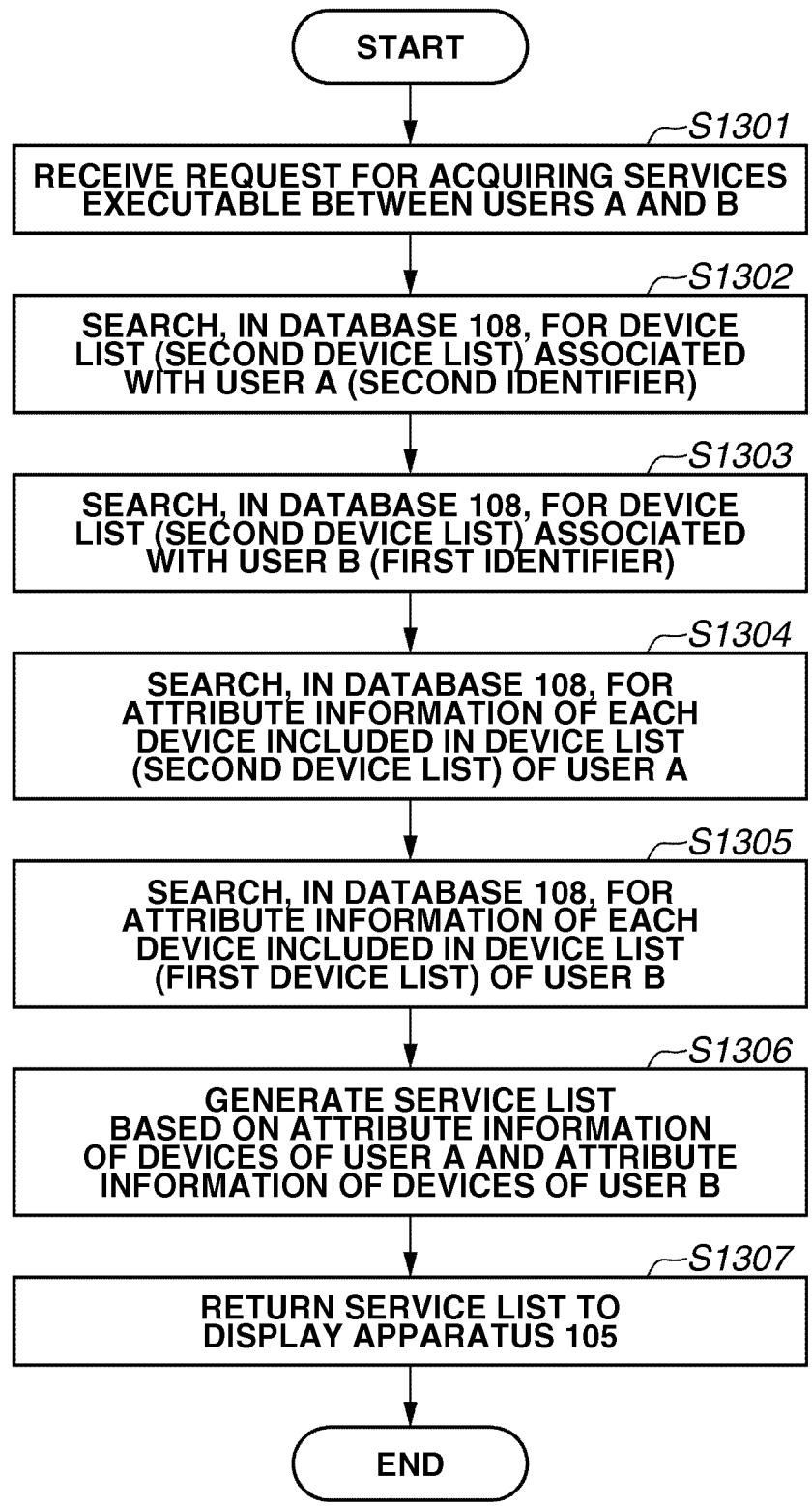
FIG. 13 is a flowchart illustrating processing performed by the server to provide a service list.

FIG. 13 is a flowchart illustrating processing performed by the server 107 when an inquiry about a service list is received from the display apparatus 105. In step S1301, the message transmitting and receiving unit 307 receives via the TCP/IP processing unit 308 a request for acquiring a list of services executable between the user A 103 and the user B 104. The generation unit 305 acquires the identifier of the user A 103 and the identifier of the user B 104 based on a request for a service list from the display apparatus 105. In step S1302, the association information storage unit 303 searches, in the database 108, for devices associated with the user A 103 by using the identifier of the user A 103 as a key. In step S1303, the association information storage unit 303 searches, in the database 108, for devices associated with the user B 104 by using the identifier of the user B 104 as a key. In step S1304, the attribute information storage unit 302 searches, in the database 109, for the attribute information of each device by using the identifier of each device owned by the user A 103 as a key.

In step S1305, the attribute information storage unit 302 searches, in the database 109, for the attribute information of each device by using the identifier of each device of the user B 104 as a key. In step S1306, the generation unit 305 generates a service list based on the attribute information of each device of the user A 103 and the attribute information of each device of the user B 104. In step S1307, the generation unit 305 generates a reply message including the generated service list. The message transmitting and receiving unit 307 transmits the reply message including the service list to the display apparatus 105 via the TCP/IP processing unit 308. Then, the processing exits the flowchart.

Figure 14:
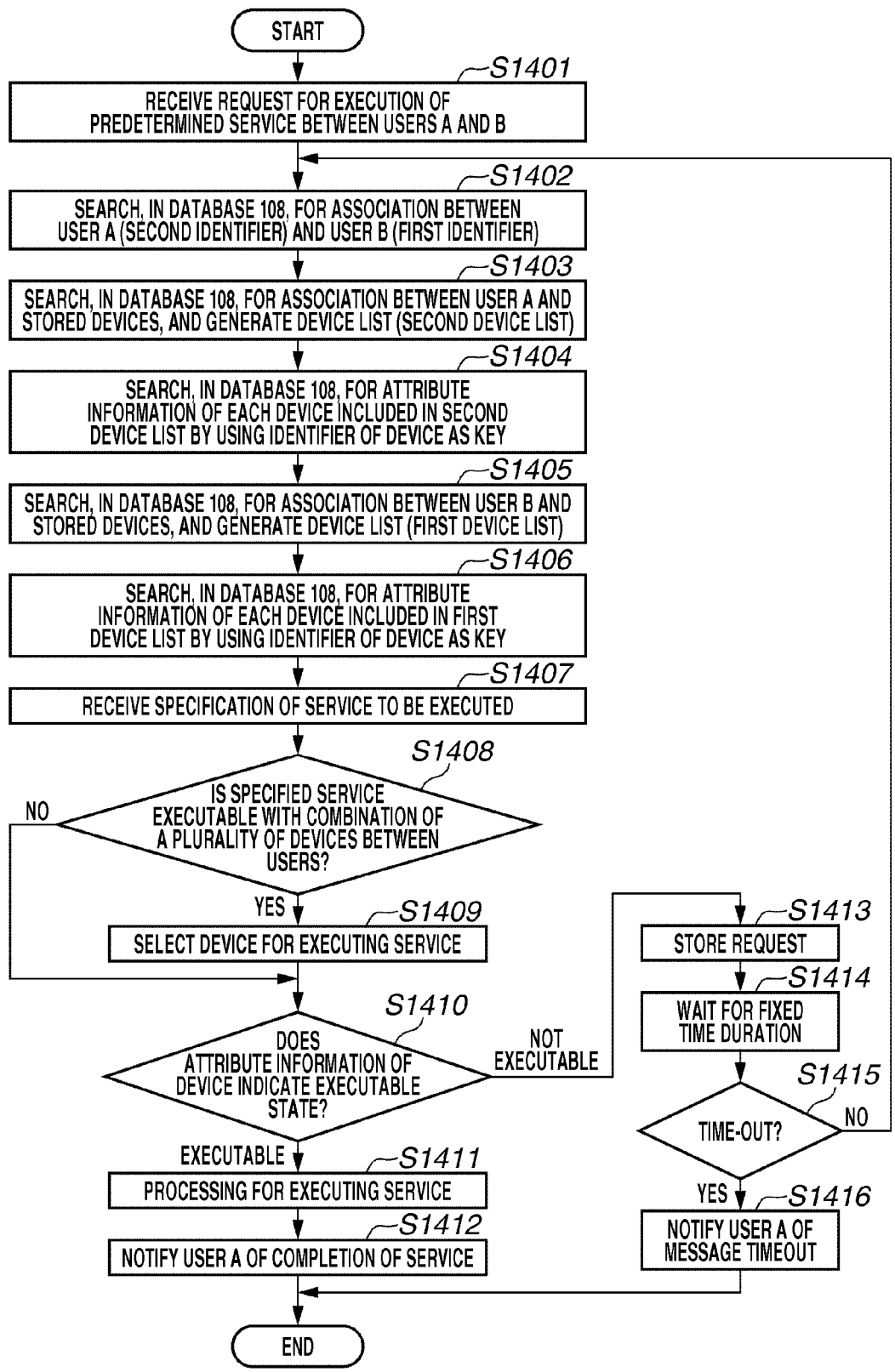
FIG. 14 is a flowchart illustrating processing performed by the server when service execution is requested.

FIG. 14 is a flowchart illustrating processing performed by the server 107 when a request to execute a service is received from the display apparatus 105. In step S1401, the message transmitting and receiving unit 307 receives via the TCP/IP processing unit 308 a request of the user A 103 to the user B 104 to execute a predetermined service. The selection unit 304 acquires the identifier of the user A 103 and the identifier of the user B 104. In step S1402, the association information storage unit 303 searches, in the database 108, for the association between the user A 103 and the user B 104 by using the identifier of the user A 103 and the identifier of the user B 104 as a key. The association information storage unit 303 searches, in the database 108, for the device list associated with the user A 103 by using the identifier of the user A 103 as a key. In step S1404, the attribute information storage unit 302 searches, in the database 109, for the attribute information of each device by using the identifier of the devices owned by the user A 103 as a key.

The association information storage unit 303 searches, in the database 108, for the device list associated with the user B 104 by using the identifier of the user B 104 as a key. In step S1406, the attribute information storage unit 302 searches, in the database 109, for the attribute information of each device by using the identifier of each device of the user B 104 as a key. In step S1407, the message transmitting and receiving unit 307 receives via the TCP/IP processing unit 308 a specification of a service which the user A 103 desires to execute. In step S1408, the selection unit 304 determines whether the specified service is executable by a plurality of devices between users. When the specified service is executable by only one combination of devices between users (NO in step S1408), the processing proceeds to step S1410. On the other hand, when the specified service is executable by a plurality of devices between users (YES in step S1408), the processing proceeds to step S1409. In step S1409, the selection unit 304 selects a device for executing the relevant service based on the association between users and the association between user and device.

The selection unit 304 determines a target device based on the association between the user A 103 and the user B 104, the association between the user A 103 and devices, the association between the user B104 and devices, and the device attribute information. The selection unit 304 determines both a transmission source device and a transmission destination device which can perform the corresponding service.

In step S1408, the execution unit 310 confirms the attribute information of the target device. When the attribute information of the device indicates the executable state (for example, available on line), i.e., the selection unit 304 determines that the device is ready to execute the service (EXECUTABLE in step S1410), the processing proceeds to step S1411. When the attribute information of the device indicates the unexecutable state (for example, in the unavailable state when off line, in the busy state when on line), the execution unit 310 determines that the device is not ready to execute the service (NOT EXECUTABLE in step S1410), and the processing proceeds to step S1413. If the device periodically updates the attribute information, the server 107 determines that the power of the device is ON. If the attribute information is not periodically updated, the server 107 determines that the power of the device is OFF. These pieces of information enables the server 107 to determine whether the attribute information of the device indicates the executable or unexecutable state.

In step S1411, the execution unit 310 performs processing for executing the relevant service. For example, the execution unit 310 generates a message requesting execution of the relevant service. The message transmitting and receiving unit 307 transmits to the target device via the TCP/IP processing unit 308 the message requesting the target device to execute the relevant service. In step S1412, upon detection of completion of the service execution, the message transmitting and receiving unit 307 notifies the user A of the completion of the service execution. Then, the processing exits the flowchart. In step S1413, the message transmitting and receiving unit 307 stores the service execution request in the message storage unit 306. Then, the processing proceeds to step S1414. In step S1414, the message storage unit 306 waits for a fixed period of time. Then, the processing proceeds to step S1415. In step S1415, the message storage unit 306 compares a preset time-out time with the elapsed time to determine whether time-out has occurred. When the message storage unit 306 determines that time-out has occurred (YES in step S1415), the processing proceeds to step S1416. On the other hand, when the message storage unit 306 determines that time-out has not occurred (NO in step S1415), the processing returns to step S1402. Specifically, when the selected device is not ready to execute the relevant service, the execution unit 310 delays execution of the service until the relevant device becomes ready to execute the relevant service. In step S1416, the selection unit 304 generates a message notifying the display apparatus 105 of time-out. The message transmitting and receiving unit 307 transmits to the display apparatus 105 via the TCP/IP processing unit 308 the message notifying the display apparatus 105 of time-out. Then, the processing exits the flowchart.

Although, in the present exemplary embodiment, the association between users is registered in the server 107, the processing is not limited thereto. It is also possible to refer to or capture the association between users in a social networking service. In the present specification, a social networking service (SNS) refers to a service for offering a place of communication between users via a network. In a SNS, for example, users can upload user information, images, blogs (diaries), twitters, etc. which can be mutually browsed by other users. Using these pieces of information in the SNS enables constructing of an association between users. Although the association between user and device is registered in the server 107, the processing is not limited thereto. It is also possible to refer to information (registration information about the user and a device owned by him) managed on device maker sites.

As described above, in the present exemplary embodiment, a more suitable device can be selected based on the association between users and the association between user and device. Thus, users can perform communication by using a suitable device out of a plurality of devices, which effects improvement in usability. When registering a device for a user, the association between user and device can be automatically set depending on the association between users. This can provide an effect that the user can reduce the trouble of inputting a complicated association.

Figure 22:
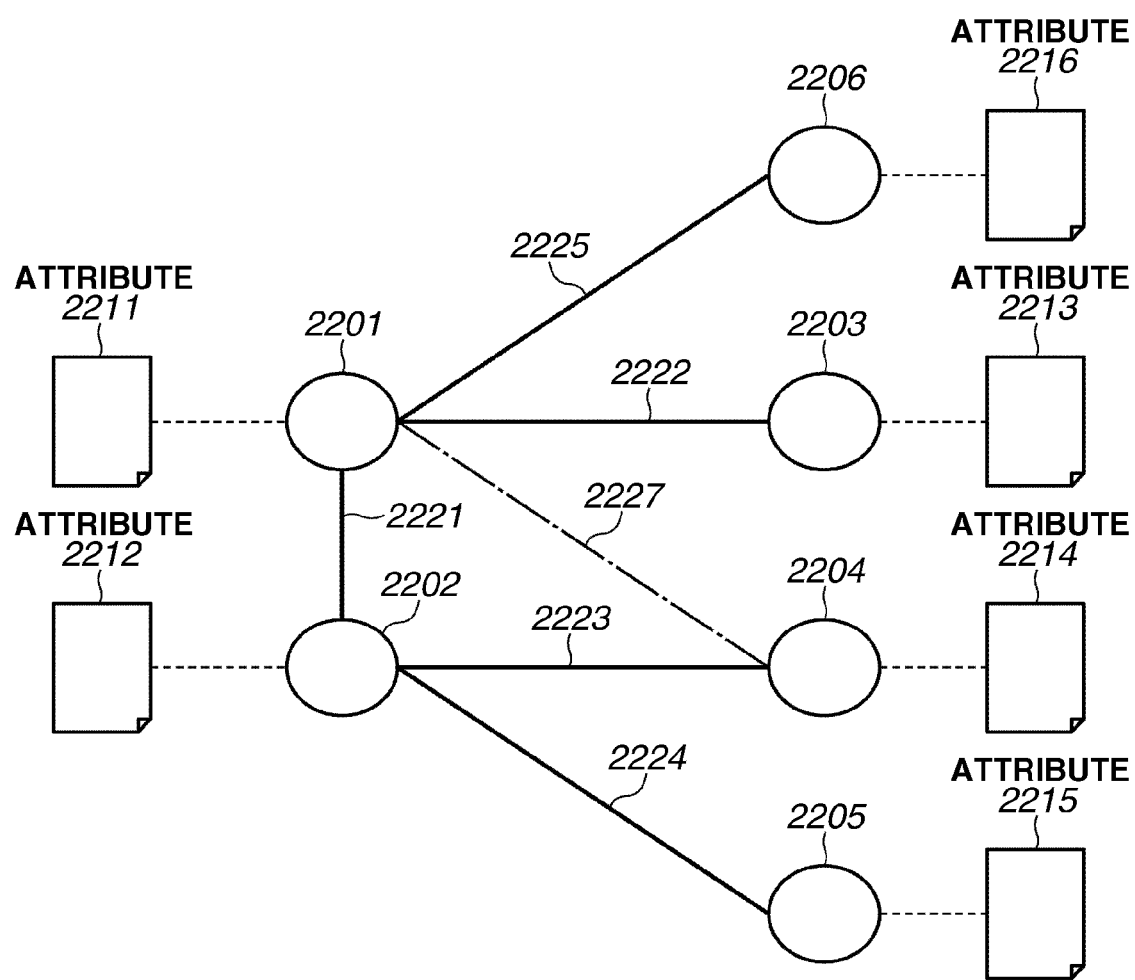
FIG. 22 illustrates a diagram of association information and attribute information managed by the server according to a second exemplary embodiment.

The following describes another example of a method for selecting a device depending on the association between users and the association between user and device according to a second exemplary embodiment. The system configuration and the configuration of each apparatus according to the second exemplary embodiment are similar to those in the first exemplary embodiment, and redundant description will be avoided. FIG. 22 is an association diagram conceptually illustrating the association between users and the association between user and device based on the association information and attribute information managed by the server 107 according to the second exemplary embodiment. Referring to the association diagram illustrated in FIG. 22, users and devices are represented as nodes, and, nodes associated with each other are connected with an edge. In the second exemplary embodiment, the user A is a worker of a company, and the user B is also a worker of the same company and an administrator who manages devices owned by the company. Referring to FIG. 22, a node 2201 indicates a company worker (the user A 103), a node 2202 indicates the administrator (the user B 104), nodes 2203 and 2206 indicate devices owned by the company worker (the user A 103), and nodes 2204 and 2205 indicate devices owned (managed) by the administrator.

Each of the nodes 2201 to 2206 is given a unique identifier determined by the server 107. The node 2201 is given an identifier 1. The node 2202 is given an identifier 2. The node 2203 is given an identifier 3. The node 2204 is given an identifier 4. The node 2205 is given an identifier 5. The node 2206 is given an identifier 6.

Attribute information 2211 is information of a company worker. Attribute information 2212 is information of the administrator. Attribute information 2213 to 2216 is information of respective devices. An association 2221 is relation between the company worker and the administrator, in which the association type is "COWORKER" and the association intensity is "50". Associations 2222 and 2225 are relation between the company worker and devices associated with the company worker. Associations 2223 and 2224 are relation between the administrator and devices associated with the administrator, in which the association type is "MANAGEMENT" and the association intensity is "100".

Figure 23:
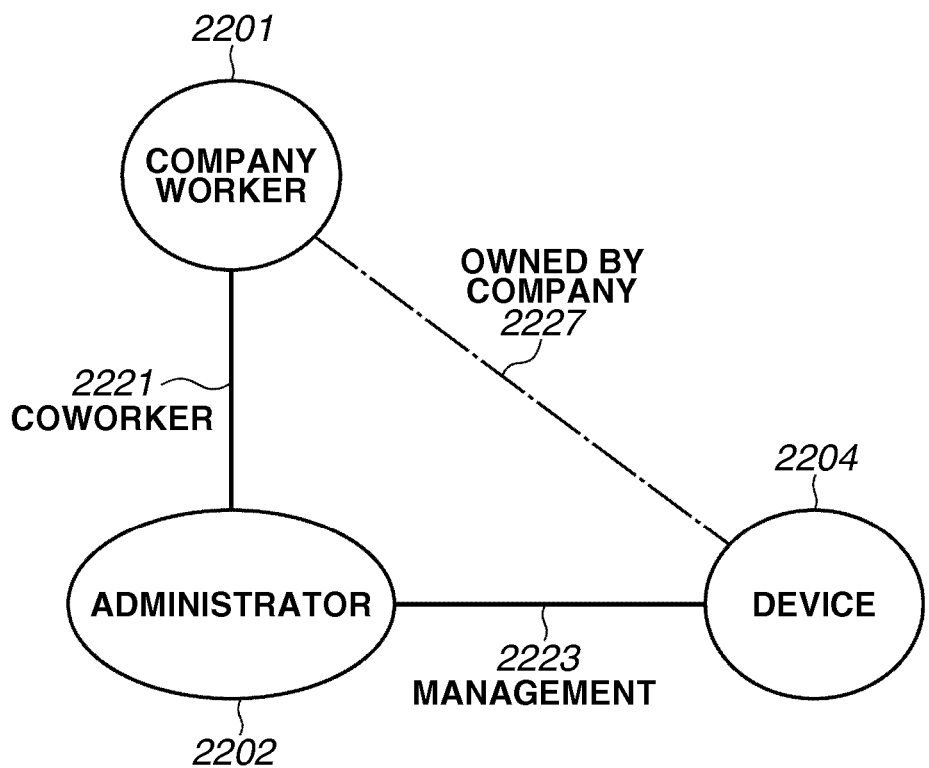
FIG. 23 illustrates a diagram used for automatically setting an association between user and device according to the second exemplary embodiment.

The following describes a case where the company worker of the node 2201 constructs an association with a device of the node 2204 (the company worker of the node 2201 associates himself or herself with the device of the node 2204). The company worker can request the server 107 to register the association with the node 2204 by instructing the server 107 to construct an association. A registration request may be made when the company worker of the node 2201 holds up a Near Field Communication (NFC) card (into which his or her ID is input) to the device of the node 2204 and the node 2204 requests the server 107 to make a registration. Referring to FIG. 23, since the device of the node 2204 is managed by the administrator (the node 2202 having the association "COWORKER" with the node 2201), an association 2227 newly determined has the association type "OWNED BY COMPANY" and the association intensity "50". Thus, corresponding to the association (the association 2221) between users, an association of a device with another user can be automatically determined and set.

Figure 24:
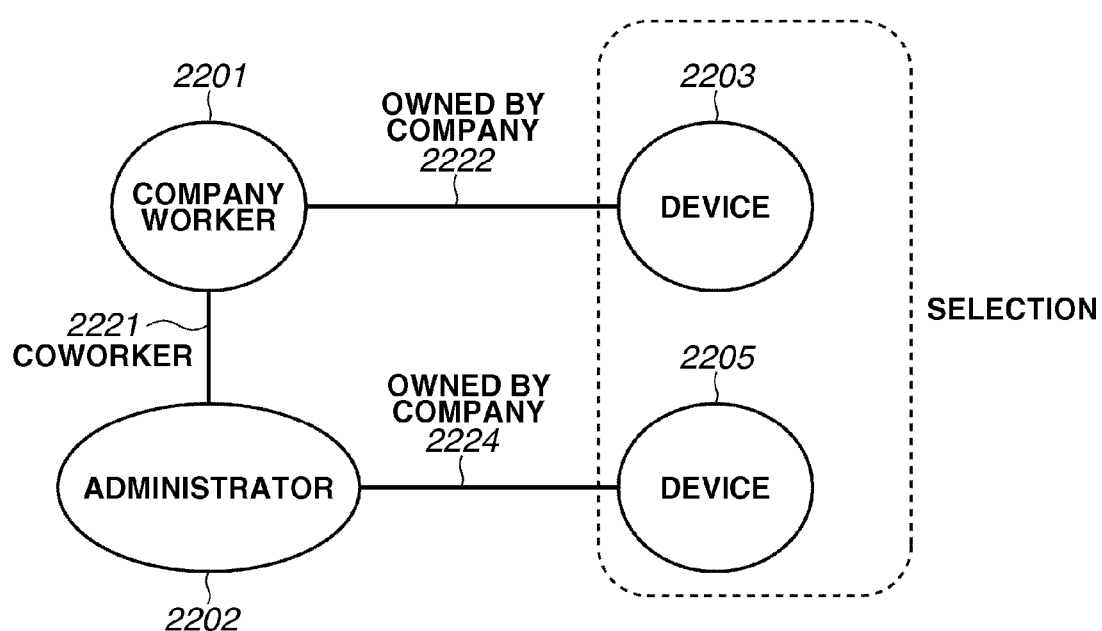
FIG. 24 illustrates another example of an association diagram according to the second exemplary embodiment.

Service execution in which the administrator sends a message to the company worker will be described below with reference to FIG. 24. Suppose that the association 2227 is not set. The company worker of the node 2201 owns the devices of the nodes 2203 and 2206. The association 2222 has the association type "PRIVATE" and the association intensity "100". On the other hand, the association 2225 has the association type "OWNED BY COMPANY" and the association intensity "50".

The administrator of the node 2202 owns the devices of the nodes 2204 and 2205. The association 2223 has the association type "MANAGEMENT" and the association intensity "100". On the other hand, the association 2224 has the association type "OWNED BY COMPANY" and the association intensity "100". The administrator acquires a list of services available between the administrator and the company worker by using the display apparatus 105. The acquired service list includes the message service and the print service. The administrator selects the message service from the service list. In this case, since the association 2221 between the administrator and the company worker has the association type "COWORKER", devices having the association type "OWNED BY COMPANY" between user and device corresponding to the association "COWORKER" between users are preferentially selected. In this case, the device of the node 2203 and the device of the node 2205 are selected. The use of the present invention enables easily executing a service between devices which are equipment of the company, only by specifying users. When a plurality of devices has the association type "OWNED BY COMPANY", a device having the highest association intensity may be selected, or, by using the attribute information (the attribute information 1513 to 1515) of respective devices, a device currently having an executable presence may be selected.

Figure 11A:
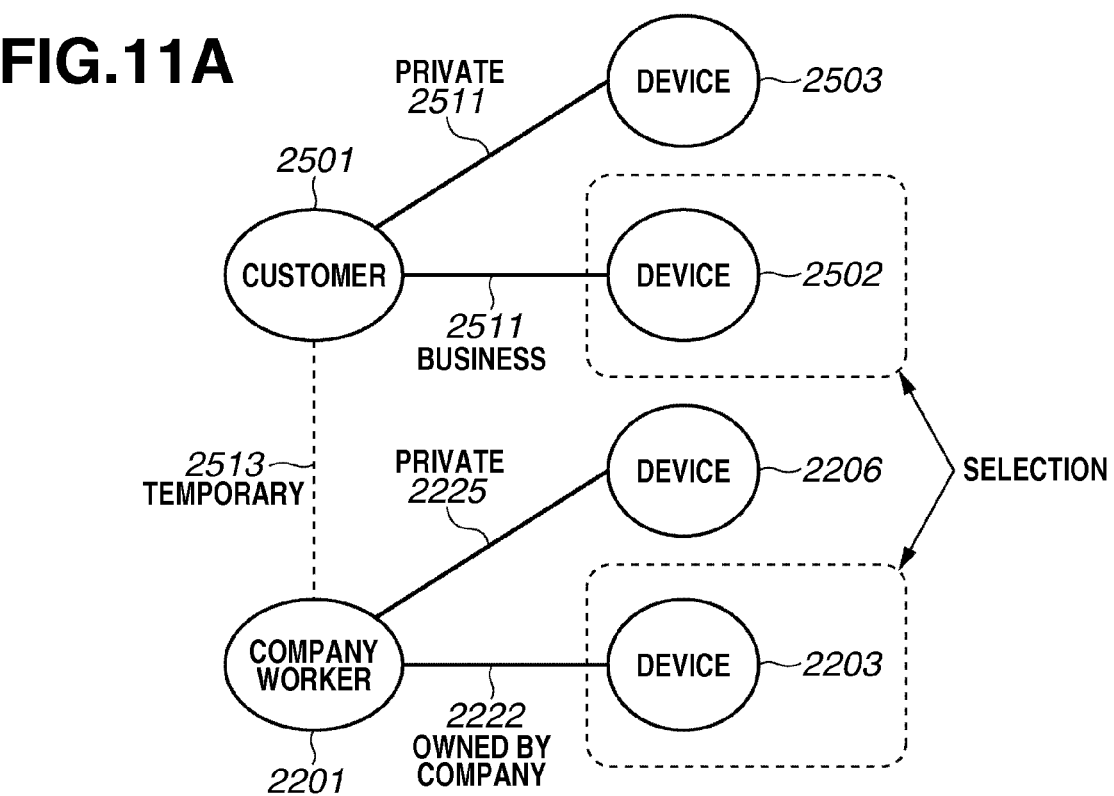
FIGS. 11A and 11B illustrate association diagrams according to a second exemplary embodiment.

The following describes a case where an association is newly constructed between users having no association, and a service is executed between the users, with reference to FIG. 11A. Referring to FIG. 11A, there exists no association between a node 2501 (a customer) and the node 2201 (company worker). Suppose a case where the company worker wants to use the message service to send to the customer a document to be used for business talk. In this case, the node 2201 requests the server 107 to construct a temporary association with the user ID of the node 2501 by using the node 2206 or 2203 and to execute a service. The server 107 inquires of a device associated with the node 2501 whether a temporary association is to be constructed and the relevant service is to be carried out, and, upon reception of approval from the device, selects the device for executing the relevant service. Since a "TEMPORARY" association 2513 is constructed between the nodes 2501 and 2201, the server 107 does not use a device having a setting of the association "PRIVATE" between user and device. The server 107 selects a device having the association "BUSINESS" or "OWNED BY COMPANY" between user and device corresponding to the association "TEMPORARY" between users. The server 107 selects a device (a node 2502)

having the association type "BUSINESS" (an association 2511) as a device on the customer side. Similarly, the server 107 further selects a device (the node 2203) having the association type "OWNED BY COMPANY" (an association 2222) as a device on the company worker side. Then, the selected devices execute the relevant service between selected devices. In this case, the association "TEMPORARY" dissolves after completion of the service.

As described above, it is possible to construct a temporary association and execute a service even between users having no association. Since a temporary association dissolves after completion of a service, any service is not executed between users as long as no association is newly constructed, enabling security control. It is also possible, when generating a service list, to perform control in such a way that only message reception is possible and printing is not possible between users having no association with each other. This enables preventing a malicious user having no association from successively transmitting useless printouts.

Figure 11B:
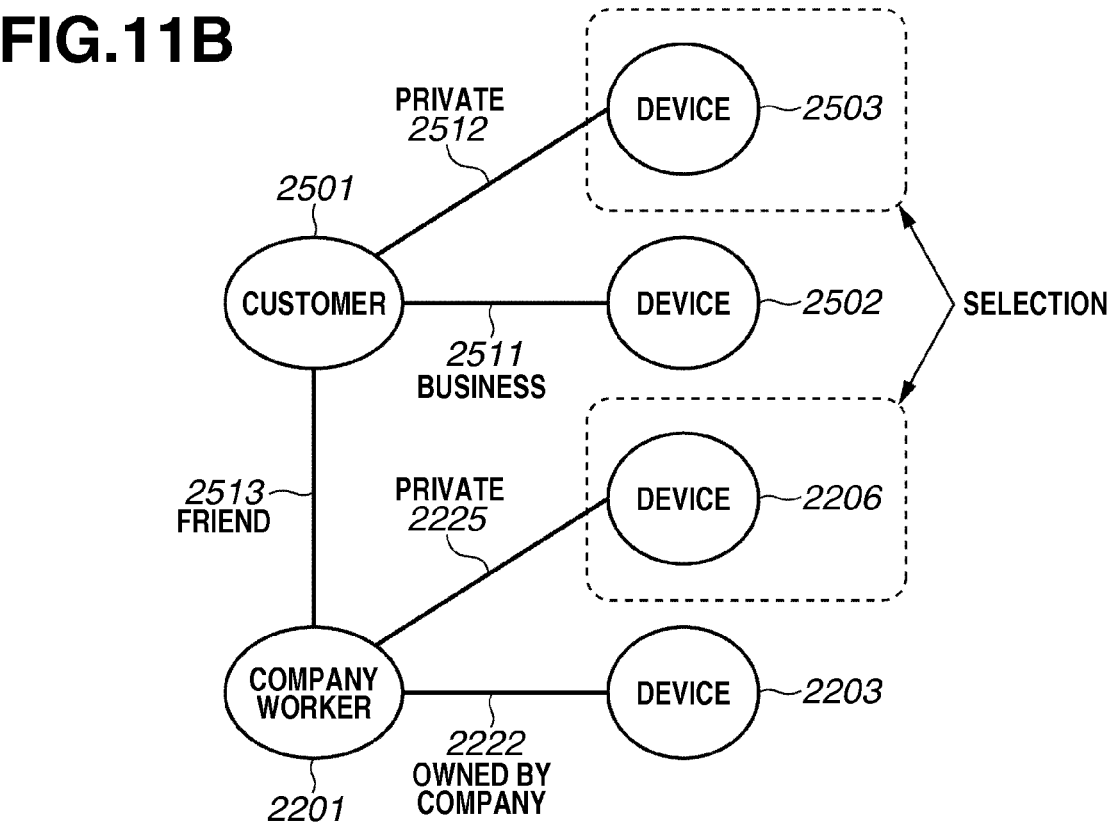

The following describes an example case in which the customer and the company worker are friends, with reference to FIG. 11B. There exists an association 2513 (having the association type "FRIEND") between the customer of the node 2501 and the company worker of the node 2201. In this case, when the customer sends a message to the company worker, a device (a node 2503) having the association type "PRIVATE" (for an association 2512) is selected as a device on the customer side. Similarly, a device (the node 2206) having the association type "PRIVATE" (for the association 2225) is selected as a device on the company worker side. Thus, a different device can be selected in the case where a request is made from an associated user. Automatically selecting a suitable device in this way effects improvement in usability.

If a plurality of devices having a similar association type is detected, a suitable device is determined based on the association intensity and the device attribute information. When the determination is made based on the device attribute information, a message may be sent to a device having the latest final login time or final operation time, out of available devices. This enables providing of a service to a more suitable device, facilitating user's convenience.

Further, the association between device user and device (construction of an association) may be automatically performed. For example, in the case of a printer at a convenience store, an association with an administrator (a management group of the convenience store) is pre-constructed. In this case, the association construction may be substituted by user registration. When a company worker (a device associated with the company worker) comes close to the printer at the convenience store, the printer at the convenience store is temporarily associated with the company worker, and a temporary association is constructed therebetween. A transmission apparatus owned by the company worker transmits the identifier of the company worker to the printer. Upon reception of the identifier, the printer registers it in the server 107. In this case, the association type is "RENTAL" and the association intensity is "0". A user can easily rent a device in this way. Further, since the identifier is registered in the server 107, the company worker can print a document addressed to him by using the printer at the convenience store.

As described above, according to the present exemplary embodiment, it is possible to select a more suitable device according to the association between users and the association between user and device. Thus, the user can perform communication by using a suitable device out of a plurality of devices, which effects improvement in usability. When registering a device for a user, the association between user and device can be automatically set according to the association between users. This enables the user to reduce the trouble of inputting a complicated association.

Other Embodiments

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and function.

This application claims priority from Japanese Patent Application No. 2012-150473 filed Jul. 4, 2012, which is hereby incorporated by reference herein in its entirety.

What is claimed is:

1. An information processing system for instructing a first device associated with a first user and any one of a plurality of devices associated with a second user to execute a predetermined service, the information processing system comprising:

one or more processors and a memory storing instructions, that when executed by the one or more processors, causes the one or more processors to acquire, from the memory, an association intensity value between the first and second user, the association intensity value indicative of a degree of intimacy between the first and second user and, for each of the plurality of devices associated with the second user, a device attribute characterizing a type of association between the second user and each of the plurality of devices; and select from the plurality of devices associated with the second user, a target device for executing a service between the first device of the first user and the target device of the second user, based on a type of predetermined service to be executed and a determination that the acquired device attribute and the acquired association intensity value between the first and second user meet a predetermined condition; and instruct the first device associated with the first user to execute the predetermined service with the selected one of the plurality of devices associated with the second user and enable connection of the first device of the first user with the selected one of the plurality of devices associated with the second user and execute the predetermined service ensuring a predetermined level of security associated with the connection and execution is met.

2. The information processing system according to claim 1, wherein, when the selected device is not ready to execute the service, execution of the service is delayed until the selected device becomes ready to execute the service.

3. The information processing system according to claim 1, wherein execution of the instructions causes the one or more processors to determine whether an association exists between the first and second users based on an identifier of the first user and an identifier of the second user, wherein, when it is determined that no association exists between the first and second user, the device associated with the first user and the device associated with the second user are not instructed to execute the predetermined service.

4. The information processing system according to claim 1, wherein the device is selected corresponding to a type of association between the first and second user.

5. The information processing system according to claim 4, wherein, when there exists a plurality of devices corresponding to the association between the first and second user and capable of executing the predetermined service, a device is selected for executing the service based on at least one of a status of the device, a frequency of device usage by the second user, and whether the second user has ownership of the device.

6. The information processing system according to claim 1, wherein execution of the instructions causes the one or more processors to present to the first device a list of services executable between the first device and the plurality of devices associated with the second user, wherein the predetermined service is a service specified by the first device based on the list of services presented.

7. The information processing system according to claim 1, wherein the first device comprises a display that displays at least one of the association between the first and second user, attribute information of the second user, and attribute information of the plurality of devices associated with the second user.

8. The information processing system according to claim 1, wherein the first device further comprises:

a reception unit configured to receive an identifier of the second user via wireless communication; and a transmission unit configured to transmit an identifier of the first user and the received identifier of the second user to a server.

9. The information processing system according to claim 1, wherein the first device further comprises:

an imaging unit configured to capture an image; and a detection unit configured to detect, in the image, an object corresponding to the second user, and wherein, when an object corresponding to the second user is detected, an identifier of the first user and an identifier of the second user are transmitted to a server.

10. The information processing system according to claim 1, wherein a device is selected for executing the service from a plurality of devices capable of executing the predetermined service out of the plurality of devices associated with the second user based on a type of association between the first and second users.

11. The information processing system according to claim 10, wherein, when a plurality of devices corresponding to the type of the association between the first and second user exist and are capable of executing the predetermined service, a device is selected from among the plurality of devices associated with the second user for executing the predetermined service based on a degree of the association between the first and second user.

12. The information processing system according to claim 1, wherein execution of the instructions causes the one or more processors to acquire an identifier of the first user and an identifier of the second user from the first device.

13. A method for selecting a device in an information processing system for instructing a first device associated with a first user and any one of a plurality of devices associated with a second user to execute a predetermined service, the method comprising:

acquiring, from a memory, an association intensity value between the first and second users, the association intensity value indicative of a degree of intimacy between the first and second users and, for each of the plurality of devices associated with the second user, a device attribute characterizing a type of association between the second user and each of the plurality of devices; and selecting from the plurality of devices associated with the second user, a target device for executing a service between the first device of the first user and the target device of the second user, based on a type of predetermined service to be executed and a determination that the acquired device attribute and the acquired association intensity value between the first and second user meet a predetermined condition; and instructing the first device associated with the first user to execute the predetermined service with the selected one of the plurality of devices associated with the second user and enabling connection of the first device of the first user with the selected one of the plurality of devices associated with the second user and execute the predetermined service ensuring a predetermined level of security associated with the connection and execution is met.

14. A non-transitory computer-readable storage medium storing a program for causing a computer to execute a method for instructing a first device associated with a first user and any one of a plurality of devices associated with a second user to execute a predetermined service, the method comprising:

acquiring, from a memory, an association intensity value between the first and second users, the association intensity value indicative of a degree of intimacy between the first and second users and, for each of the plurality of devices associated with the second user, a device attribute characterizing a type of association between the second user and each of the plurality of devices; and selecting from the plurality of devices associated with the second user, a target device for executing a service between the first device of the first user and the target device of the second user, based on a type of predetermined service to be executed and a determination that the acquired device attribute and the acquired association intensity value between the first and second user meet a predetermined condition; and instructing the first device associated with the first user to execute the predetermined service with the selected one of the plurality of devices associated with the second user and enabling connection of the first device of the first user with the selected one of the plurality of devices associated with the second user and execute the predetermined service ensuring a predetermined level of security associated with the connection and execution is met.

* * * * *